(12) United States Patent
Sakakibara

(10) Patent No.: US 12,302,023 B2
(45) Date of Patent: May 13, 2025

(54) SOLID-STATE IMAGING ELEMENT AND IMAGING DEVICE THAT DETECT ADDRESS EVENT

(71) Applicant: SONY SEMICONDUCTOR SOLUTIONS CORPORATION, Kanagawa (JP)

(72) Inventor: Masaki Sakakibara, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/422,181

(22) Filed: Jan. 25, 2024

(65) Prior Publication Data

US 2024/0163588 A1 May 16, 2024

Related U.S. Application Data

(63) Continuation of application No. 17/293,254, filed as application No. PCT/JP2019/039621 on Oct. 8, 2019, now Pat. No. 11,917,317.

(30) Foreign Application Priority Data

Nov. 21, 2018 (JP) ................................ 2018-218011

(51) Int. Cl.
*H04N 25/772* (2023.01)
*H04N 25/47* (2023.01)

(52) U.S. Cl.
CPC ........... *H04N 25/772* (2023.01); *H04N 25/47* (2023.01)

(58) Field of Classification Search
CPC ............. H04N 5/37455; H04N 5/3745; H04N 25/772; H04N 25/47; H04N 25/40
See application file for complete search history.

(56) References Cited

U.S. PATENT DOCUMENTS 11,917,319 B2 * 2/2024 Sasaki ................. H04N 5/2628
2009/0033532 A1 2/2009 Reshef et al.
(Continued)

FOREIGN PATENT DOCUMENTS

| CN | 103595930 A | 2/2014 |
| JP | 2014-039159 A | 2/2014 |
| WO | 2017/009944 A1 | 1/2017 |
| WO | 2017/013806 A1 | 1/2017 |

OTHER PUBLICATIONS

International Search Report and Written Opinion of PCT Application No. PCT/JP2019/039621, issued on Dec. 17, 2019, 08 pages of English Translation and 07 pages of ISRWO.

(Continued)

*Primary Examiner* — Nicholas G Giles
(74) *Attorney, Agent, or Firm* — CHIP LAW GROUP

(57) ABSTRACT

A high-quality image is taken by a solid-state imaging element that detects an address event. The solid-state imaging element is provided with a pixel array unit and an analog-to-digital conversion unit. In the pixel array unit in the solid-state imaging element, a normal pixel that generates an analog signal by photoelectric conversion of incident light and outputs the analog signal and a detection pixel that detects that an amount of change in incident light becomes larger than a predetermined threshold and outputs a detection result are arranged. Furthermore, the analog-to-digital conversion unit converts the analog signal into a digital signal.

12 Claims, 25 Drawing Sheets

(56) References Cited

U.S. PATENT DOCUMENTS

| | | | |
|---|---|---|---|
| 2014/0009648 A1* | 1/2014 | Kim | H04N 25/134 348/272 |
| 2014/0022430 A1* | 1/2014 | Ueno | H04N 25/78 438/66 |
| 2014/0049675 A1 | 2/2014 | Takatsuka et al. | |
| 2017/0366764 A1* | 12/2017 | Innocent | H04N 25/77 |
| 2018/0152644 A1 | 5/2018 | Kondo et al. | |
| 2018/0167575 A1* | 6/2018 | Watanabe | H04N 25/78 |

OTHER PUBLICATIONS

Lichtsteiner, et al., "A 128x128 120 dB 15 µS Latency Asynchronous Temporal Contrast Vision Sensor", IEEE Journal of Solid-State Circuits, vol. 43, No. 2, Feb. 2008, 25 pages.

Notice of Allowance for U.S. Appl. No. 17/293,254, issued on Oct. 27, 2023, 8 pages.

Final Office Action for U.S. Appl. No. 17/293,254, issued on Jul. 13, 2023, 25 pages.

Non-Final Office Action for U.S. Appl. No. 17/293,254, issued on Mar. 10, 2023, 23 pages.

Final Office Action for U.S. Appl. No. 17/293,254, issued on Nov. 14, 2022, 23 pages.

Non-Final Office Action for U.S. Appl. No. 17/293,254, issued on Jun. 22, 2022, 19 pages.

International Preliminary Report on Patentability of PCT Application No. PCT/JP2019/039621, issued on Jun. 3, 2021, 09 pages of English Translation and 05 pages of IPRP.

Advisory Action for U.S. Appl. No. 17/293,254, issued on Jan. 26, 2023, 02 pages.

Advisory Action for U.S. Appl. No. 17/293,254, issued on Sep. 20, 2023, 02 pages.

* cited by examiner

300

310

| NORMAL PIXEL (G) | NORMAL PIXEL (R) 400 | NORMAL PIXEL (G) | NORMAL PIXEL (R) | ... |
|---|---|---|---|---|
| NORMAL PIXEL (B) | ADDRESS EVENT DETECTION PIXEL (G) | NORMAL PIXEL (B) | ADDRESS EVENT DETECTION PIXEL (G) | |
| NORMAL PIXEL (G) | NORMAL PIXEL (R) | NORMAL PIXEL (G) | NORMAL PIXEL (R) | |
| NORMAL PIXEL (B) | ADDRESS EVENT DETECTION PIXEL (G) | NORMAL PIXEL (B) | ADDRESS EVENT DETECTION PIXEL (G) | |

| NORMAL PIXEL (G) | NORMAL PIXEL (R) 400 | NORMAL PIXEL (G) | NORMAL PIXEL (R) | ... |
|---|---|---|---|---|
| NORMAL PIXEL (B) | ADDRESS EVENT DETECTION PIXEL (G) | NORMAL PIXEL (B) | ADDRESS EVENT DETECTION PIXEL (R) | |
| NORMAL PIXEL (G) | NORMAL PIXEL (R) | NORMAL PIXEL (G) | NORMAL PIXEL (R) | |
| NORMAL PIXEL (B) | ADDRESS EVENT DETECTION PIXEL (B) | NORMAL PIXEL (B) | ADDRESS EVENT DETECTION PIXEL (G) | |

| 400 | | 310 | |
|---|---|---|---|
| NORMAL PIXEL (R) | NORMAL PIXEL (G) | ADDRESS EVENT DETECTION PIXEL | ADDRESS EVENT DETECTION PIXEL |
| NORMAL PIXEL (G) | NORMAL PIXEL (B) | ADDRESS EVENT DETECTION PIXEL | ADDRESS EVENT DETECTION PIXEL |
| ADDRESS EVENT DETECTION PIXEL | ADDRESS EVENT DETECTION PIXEL | NORMAL PIXEL (R) | NORMAL PIXEL (G) |
| ADDRESS EVENT DETECTION PIXEL | ADDRESS EVENT DETECTION PIXEL | NORMAL PIXEL (G) | NORMAL PIXEL (B) |

FIG. 21A

| 400 | | 310 | |
|---|---|---|---|
| NORMAL PIXEL (R) | NORMAL PIXEL (G) | ADDRESS EVENT DETECTION PIXEL (R) | ADDRESS EVENT DETECTION PIXEL (G) |
| NORMAL PIXEL (G) | NORMAL PIXEL (B) | ADDRESS EVENT DETECTION PIXEL (G) | ADDRESS EVENT DETECTION PIXEL (B) |
| ADDRESS EVENT DETECTION PIXEL (R) | ADDRESS EVENT DETECTION PIXEL (G) | NORMAL PIXEL (R) | NORMAL PIXEL (G) |
| ADDRESS EVENT DETECTION PIXEL (G) | ADDRESS EVENT DETECTION PIXEL (B) | NORMAL PIXEL (G) | NORMAL PIXEL (B) |

FIG. 21B

SOLID-STATE IMAGING ELEMENT AND IMAGING DEVICE THAT DETECT ADDRESS EVENT

CROSS REFERENCE TO RELATED APPLICATIONS

This application is a continuation application of U.S. patent application Ser. No. 17/293,254 filed on May 12, 2021, which is a U.S. National Phase of International Patent Application No. PCT/JP2019/039621 filed on Oct. 8, 2019, which claims priority benefit of Japanese Patent Application No. JP 2018-218011 filed in the Japan Patent Office on Nov. 21, 2018. Each of the above-referenced applications is hereby incorporated herein by reference in its entirety.

TECHNICAL FIELD

The present technology relates to a solid-state imaging element and an imaging device. More specifically, the present technology relates to a solid-state imaging element that detects whether or not an amount of change in incident light becomes larger than a threshold, and an imaging device.

BACKGROUND ART

Conventionally, a synchronous solid-state imaging element that images image data (frame) in synchronization with a synchronization signal such as a vertical synchronization signal is used in an imaging device and the like. With this general synchronous solid-state imaging element, the image data may be obtained only at every synchronization signal cycle (for example, 1/60 second), so that it is difficult to cope with a case where higher-speed processing is required in a field regarding traffic, robot and the like. Therefore, an asynchronous solid-state imaging element provided with an address event representation (AER) circuit that detects an address event has been proposed (refer to, for example, Non-Patent Document 1). Here, the address event means that a light amount of a pixel fluctuates in a certain pixel address and a fluctuation amount becomes larger than a threshold. The address event includes an on-event indicating that the light amount of the pixel fluctuates and the fluctuation amount becomes larger than a predetermined upper limit, and an off-event indicating that the fluctuation amount becomes smaller than a predetermined lower limit. In the asynchronous solid-state imaging element, two-bit data including a one-bit on-event detection result and a one-bit off-event detection result is generated for every pixel. A format of image data that represents presence or absence of each of the on-event and the off-event by the two-bit data for every pixel in this manner is referred to as an AER format.

CITATION LIST

Non-Patent Document

Non-Patent Document 1: Patrick Lichtsteiner, et al., A 128 128 120 dB 15 µs Latency Asynchronous Temporal Contrast Vision Sensor, IEEE JOURNAL OF SOLID-STATE CIRCUITS, VOL. 43, NO. 2, FEBRUARY 2008.

SUMMARY OF THE INVENTION

Problems to be Solved by the Invention

The asynchronous solid-state imaging element described above may generate data at a much higher speed than that with the synchronous solid-state imaging element to output. For this reason, for example, in a traffic field, image recognition processing of a person or an obstacle may be executed at a high speed to improve safety. However, since the above-described address event representation circuit may generate only the two-bit data for every pixel, an image quality of the image data is deteriorated as compared with that in the synchronous solid-state imaging element. In order to generate higher-quality image data while detecting an address event, it is possible to provide both the asynchronous solid-state imaging element and synchronous solid-state imaging element, but this is not desirable because a size, the number of parts, and a cost increase. In this manner, there is a problem that it is difficult to take a high-quality image by the solid-state imaging element that detects the address event.

The present technology is achieved in view of such a situation, and an object thereof is to take the high-quality image in the solid-state imaging element that detects the address event.

Solutions to Problems

The present technology is achieved for solving the above-described problem, and a first aspect thereof is a solid-state imaging element provided with a pixel array unit in which a normal pixel that generates an analog signal by photoelectric conversion of incident light and outputs the analog signal and a detection pixel that detects that an amount of change in incident light becomes larger than a predetermined threshold and outputs a detection result are arranged, and an analog-to-digital conversion unit that converts the analog signal into a digital signal. This brings an effect that the digital signal and a detection result of an address event are output.

Furthermore, in the first aspect, the normal pixel may be provided with a photodiode that photoelectrically converts the incident light to generate electric charge, a discharge transistor that discharges the electric charge from the photodiode, a former stage electric charge accumulation unit that accumulates the electric charge, a former stage transfer transistor that transfers the electric charge from the photodiode to the former stage electric charge accumulation unit, a latter stage electric charge accumulation unit that accumulates the electric charge and generates a voltage corresponding to an amount of the electric charge, a reset transistor that initializes the latter stage electric charge accumulation unit, and a latter stage transfer transistor that transfers the electric charge from the former stage electric charge accumulation unit to the latter stage electric charge accumulation unit. This brings an effect that the electric charge is sequentially transferred to the former stage electric charge accumulation unit and the latter stage electric charge accumulation unit and the analog signal is generated.

Furthermore, in the first aspect, the discharge transistor may discharge the electric charge at predetermined exposure starting timing, the former stage transfer transistor may transfer the electric charge at predetermined exposure finishing timing, the reset transistor may initialize the latter stage electric charge accumulation unit when the electric charge is transferred to the former stage electric charge accumulation unit, and the latter stage transfer transistor may transfer the electric charge when the latter stage electric charge accumulation unit is initialized. This brings an effect that exposure and reading of all the normal pixels are performed.

Furthermore, in the first aspect, the normal pixel may be provided with a photodiode that photoelectrically converts the incident light to generate electric charge, an electric charge accumulation unit that accumulates the electric charge and generates a voltage corresponding to an amount of the electric charge, a transfer transistor that transfers the electric charge from the photodiode to the electric charge accumulation unit, and a reset transistor that initializes the electric charge accumulation unit. This brings an effect that the electric charge is transferred to the electric charge accumulation unit and the analog signal is generated.

Furthermore, in the first aspect, the transfer transistor may transfer the electric charge at predetermined exposure starting timing, the reset transistor may initialize the electric charge accumulation unit at the exposure starting timing, the transfer transistor may transfer the electric charge at predetermined exposure finishing timing, and the reset transistor may initialize the electric charge accumulation unit when the electric charge is transferred. This brings an effect that exposure and reading of all the normal pixels are performed.

Furthermore, in the first aspect, a predetermined number of columns may be arranged in a direction perpendicular to a predetermined direction in the pixel array unit, at least one of the normal pixel or the detection pixel may be arranged in each of the predetermined number of columns, in the analog-to-digital conversion unit, analog-to-digital converters of a positive integral multiple of the arranged number of the predetermined number of columns may be arranged, and each of the predetermined number of analog-to-digital converters may convert the analog signal from a different column out of the predetermined number of columns into the digital signal. This brings an effect that the digital signal is read in every row.

Furthermore, in the first aspect, in the pixel array unit, the detection pixel may be arranged in any of two rows by two columns, and the normal pixel may be arranged in the rest. This brings an effect that the address event is detected in any of two rows by two columns, and the analog pixel signal is output from the rest.

Furthermore, in the first aspect, in the pixel array unit, detection pixels may be arranged in two rows by two columns, and normal pixels may be arranged in two rows by two columns so as to be adjacent to the detection pixels. This brings an effect that the address event is detected and the pixel signal is output in units of two rows by two columns.

Furthermore, in the first aspect, the detection pixel may further output the analog signal. This brings an effect that the pixel signal may also be obtained from the detection pixel.

Furthermore, a second aspect of the present technology is an imaging device provided with a pixel array unit in which a normal pixel that generates an analog signal by photoelectric conversion of incident light and outputs the analog signal and a detection pixel that detects that an amount of change in incident light becomes larger than a predetermined threshold and outputs a detection result are arranged, an analog-to-digital conversion unit that converts the analog signal into a digital signal, and a digital signal processing unit that processes the digital signal.

This brings an effect that the digital signal and the detection result of the address event are output, and the digital signal is processed.

BRIEF DESCRIPTION OF DRAWINGS

FIGS. 20A and 20B are block diagrams illustrating a configuration example of the pixel array unit in which the address event detection pixel is also colored in the first embodiment of the present technology.

FIGS. 21A and 21B are block diagrams illustrating a configuration example of the pixel array unit in which an arrangement pattern is changed in the first embodiment of the present technology.

MODE FOR CARRYING OUT THE INVENTION

A mode for carrying out the present technology (hereinafter, referred to as an embodiment) is hereinafter described. The description is given in the following order.
1. First Embodiment (example in which normal pixel and address event detection pixel are arranged)
2. Second Embodiment (example in which normal pixel from which element is reduced and address event detection pixel are arranged)
3. Application Example to Mobile Body 1. First Embodiment

[Configuration Example of Imaging Device]

Figure 1:
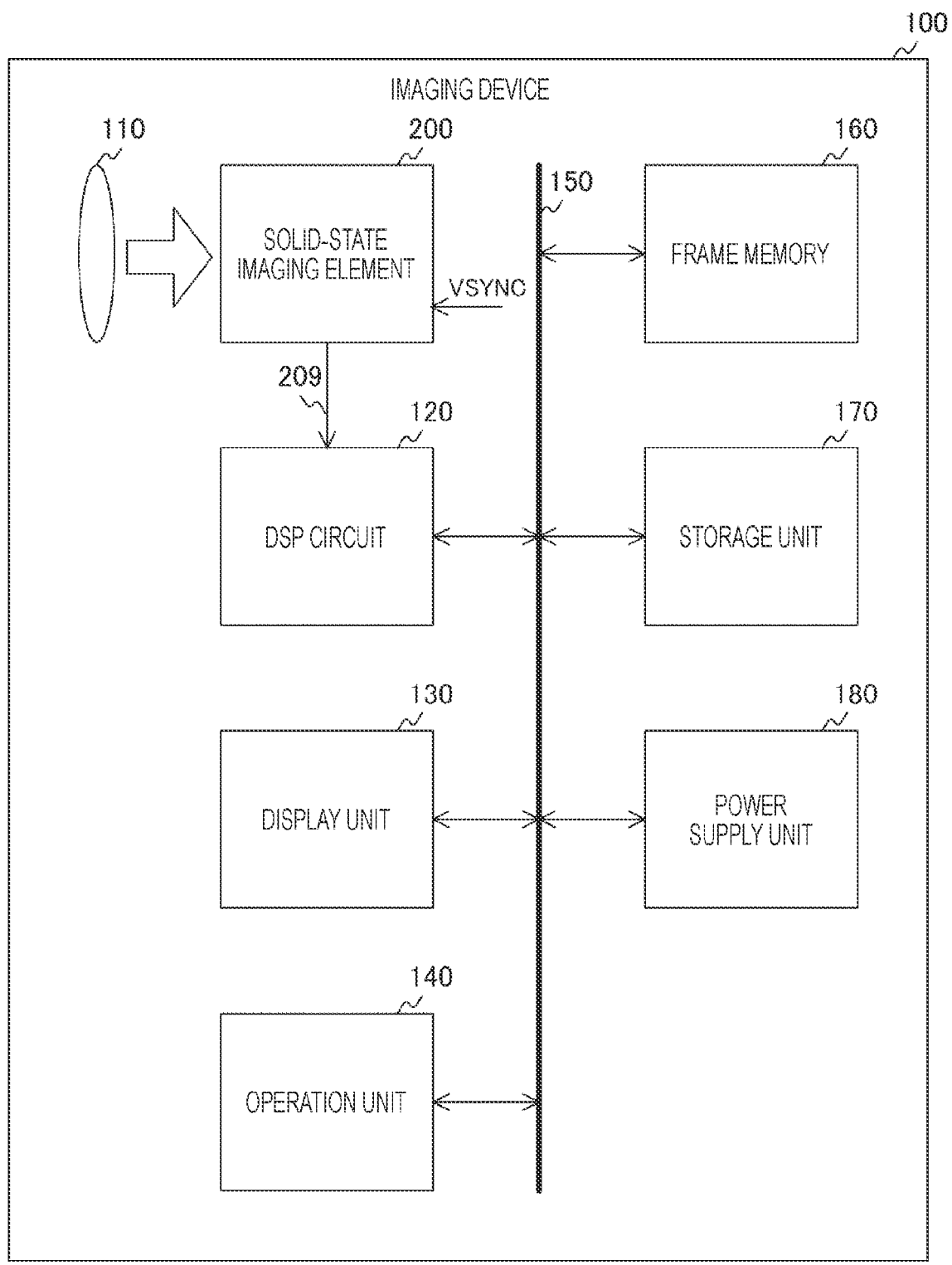
FIG. 1 is a block diagram illustrating a configuration example of an imaging device in a first embodiment of the present technology.

FIG. 1 is a block diagram illustrating a configuration example of an imaging device 100 in a first embodiment of the present technology. The imaging device 100 is a device for imaging image data, and is provided with an optical unit 110, a solid-state imaging element 200, and a digital signal processing (DSP) circuit 120. The imaging device 100 is further provided with a display unit 130, an operation unit 140, a bus 150, a frame memory 160, a storage unit 170, and a power supply unit 180. As the imaging device 100, for example, in addition to a digital camera such as a digital still camera, a smartphone and a personal computer having an imaging function, an in-vehicle camera and the like are assumed.

The optical unit 110 condenses light from a subject and guides the same to the solid-state imaging element 200. The solid-state imaging element 200 generates the image data by photoelectric conversion in synchronization with a vertical synchronization signal VSYNC. Here, the vertical synchronization signal VSYNC is a periodic signal of a predetermined frequency indicating imaging timing. The solid-state imaging element 200 supplies the generated image data to the DSP circuit 120 via a signal line 209.

The DSP circuit 120 executes predetermined signal processing on the image data from the solid-state imaging element 200. The DSP circuit 120 outputs the processed image data to the frame memory 160 and the like via the bus 150. Note that the DSP circuit 120 is an example of a digital signal processing unit recited in claims.

The display unit 130 displays the image data. As the display unit 130, for example, a liquid crystal panel or an organic electro luminescence (EL) panel is assumed. The operation unit 140 generates an operation signal in accordance with a user operation.

The bus 150 is a common path for the optical unit 110, the solid-state imaging element 200, the DSP circuit 120, the display unit 130, the operation unit 140, the frame memory 160, the storage unit 170, and the power supply unit 180 to exchange data with one another.

The frame memory 160 holds the image data. The storage unit 170 stores various data such as the image data. The power supply unit 180 supplies power to the solid-state imaging element 200, the DSP circuit 120, the display unit 130 and the like.

[Configuration Example of Solid-state Imaging Element]

Figure 2:
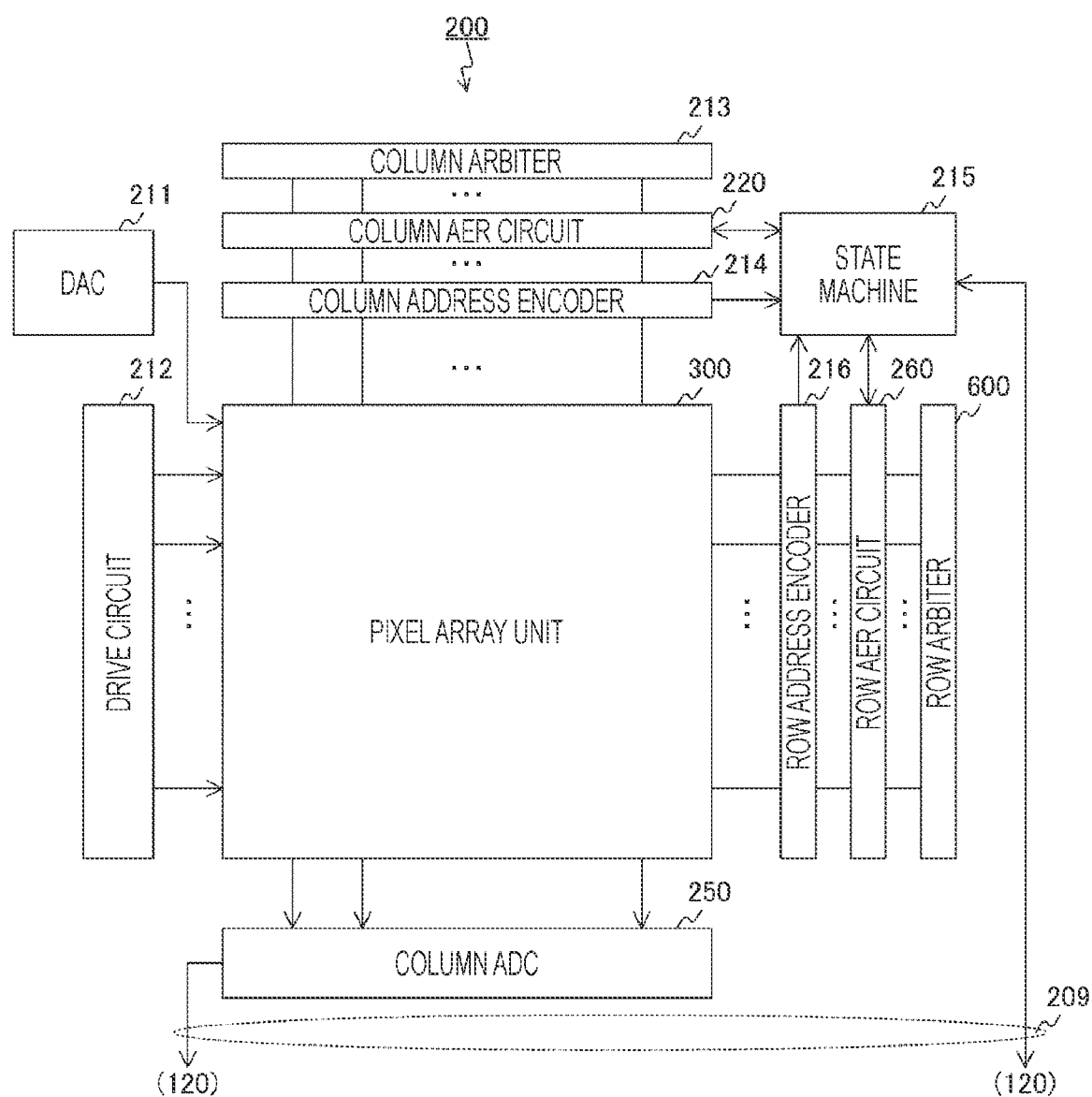
FIG. 2 is a block diagram illustrating a configuration example of a solid-state imaging element in the first embodiment of the present technology.

FIG. 2 is a block diagram illustrating a configuration example of the solid-state imaging element 200 in the first embodiment of the present technology. The solid-state imaging element 200 is provided with a digital-to-analog converter (DAC) 211, a drive circuit 212, a column arbiter 213, a column AER circuit 220, and a column address encoder 214. Furthermore, the solid-state imaging element 200 is provided with a pixel array unit 300, a column ADC 250, a state machine 215, a row address encoder 216, a row AER circuit 260, and a row arbiter 600. Furthermore, in the pixel array unit 300, a plurality of pixels is arranged in a two-dimensional lattice manner. Hereinafter, in the pixel array unit 300, a set of pixels arranged in a predetermined direction is referred to as a "row", and a set of pixels arranged in a direction perpendicular to the row is referred to as a "column".

The DAC 211 generates an analog reference signal that changes in a slope shape by digital-to-analog (DA) conversion. The DAC 211 supplies the reference signal to the pixel array unit 300.

The drive circuit 212 drives the pixels in the pixel array unit 300 in synchronization with the vertical synchronization signal VSYNC.

Some of the pixels in the pixel array unit 300 generate a detection result of an address event, and others generate an analog pixel signal. Here, the address event includes an on-event and an off-event, and the detection result includes a one-bit on-event detection result and a one-bit off-event detection result. The on-event means that, when a light amount of a pixel fluctuates to a value larger than a predetermined reference value, a fluctuation amount becomes larger than a predetermined threshold. In contrast, the off-event means that, when the light amount of the pixel fluctuates to a value smaller than a predetermined reference value, a fluctuation amount becomes smaller than a predetermined threshold.

The pixel array unit 300 supplies the pixel signal to the column ADC 250. Furthermore, the pixel array unit 300 transmits and receives a request and a response (hereinafter, referred to as "handshake") to and from the row AER circuit 260 when detecting the address event in order to externally output the detection result of the address event. Next, the pixel array unit 300 performs the handshake with the column AER circuit 220.

The column arbiter 213 arbitrates the request from the column AER circuit 220 and transmits the response to the column AER circuit 220 on the basis of an arbitration result.

The column AER circuit 220 transmits and receives the request to require the external output of the detection result of the address event and the response (performs the handshake) with each of the columns, the column arbiter 213, and the state machine 215.

The column address encoder 214 encodes an address of a column in which the address event occurs and transmits the same to the state machine 215.

The column ADC 250 performs analog-to-digital conversion processing and correlated double sampling (CDS) processing on the pixel signal. The image data including the processed data is supplied to the DSP circuit 120. Note that the column ADC 250 is an example of an analog-to-digital conversion unit recited in claims.

The row address encoder 216 encodes an address of a row in which the address event occurs and transmits the same to the state machine 215.

The row arbiter 600 arbitrates the request from the row AER circuit 260 and transmits the response to the row AER circuit 260 on the basis of an arbitration result.

The row AER circuit 260 transmits and receives the request to require the external output of the detection result of the address event and the response (performs the handshake) with each of the rows, the row arbiter 600, and the state machine 215.

The state machine 215 performs the handshake with the column AER circuit 220 and the row AER circuit 260. Upon receiving the request from the column AER circuit 220 and the row AER circuit 260, the state machine 215 decodes data from the column address encoder 214 and the row address encoder 216 to specify the address in which the address event is detected. Then, the state machine 215 supplies a detection result of the address to the DSP circuit 120. The image data is generated by arranging the detection results of the address events of the respective pixels in a two-dimensional lattice manner.

Hereinafter, the image data not in an AER format from the column ADC 250 is referred to as "normal image data", and the image data in the AER format is referred to as "AER image data".

[Configuration Example of Pixel Array Unit]

Figure 3:
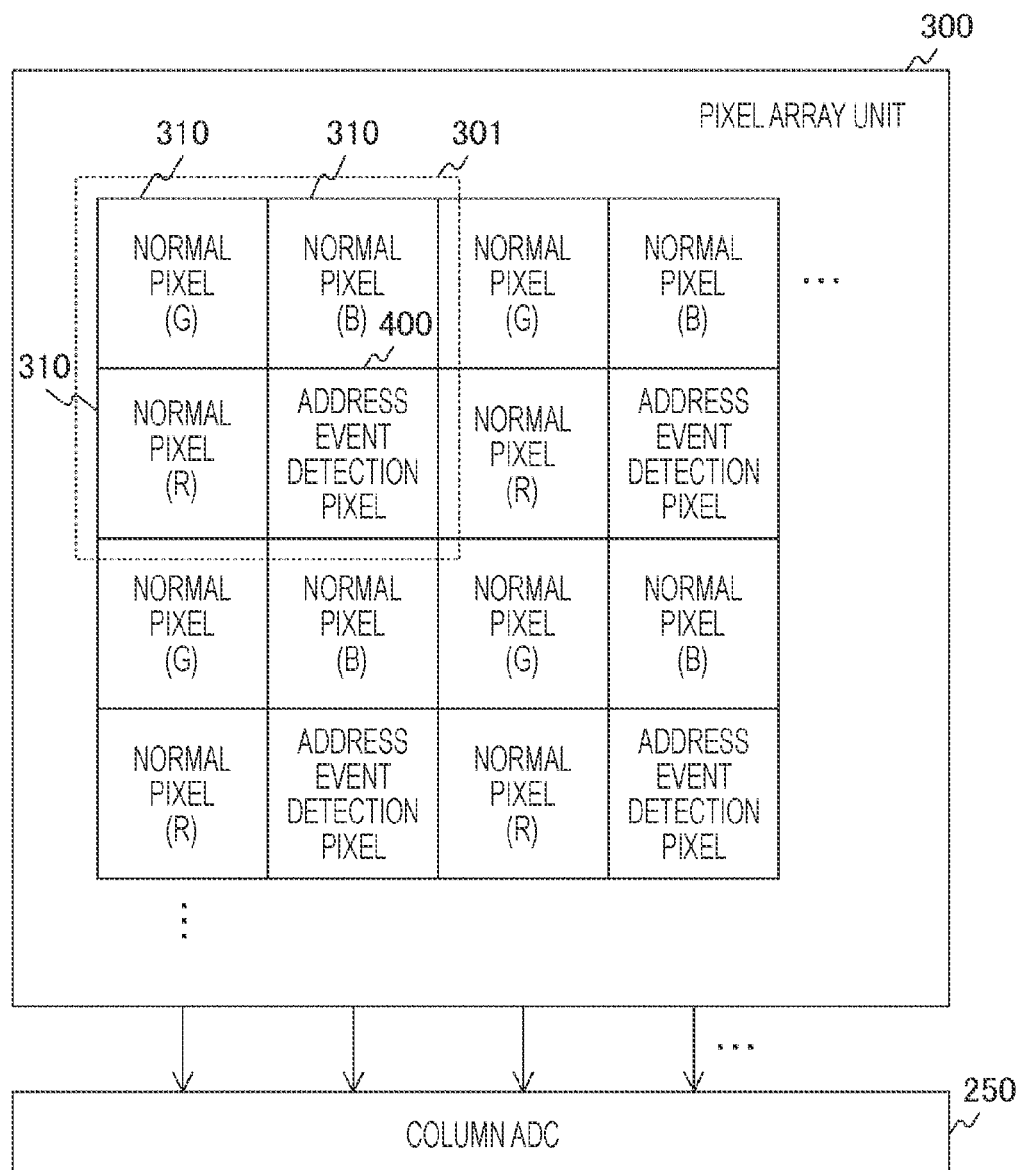
FIG. 3 is a block diagram illustrating a configuration example of a pixel array unit in the first embodiment of the present technology.

FIG. 3 is a block diagram illustrating a configuration example of the pixel array unit 300 in the first embodiment of the present technology. In the pixel array unit 300, a plurality of pixel blocks 301 is arranged in a two-dimensional lattice manner. Four pixels of two rows by two columns are arranged in each of the pixel blocks 301. Three of these pixels are normal pixels 310 and the remaining one is an address event detection pixel 400.

The normal pixel 310 generates the analog pixel signal by photoelectric conversion of incident light and outputs the same to the column ADC 250. In the pixel block 301, for example, a red (R) pixel that generates a red pixel signal, a green (G) pixel that generates a green pixel signal, and a blue (B) pixel that generates a blue pixel signal are provided as the normal pixels 310. Note that the G pixel is desirably arranged diagonally to the address event detection pixel 400.

The address event detection pixel 400 detects that an amount of change in the incident light becomes larger than a predetermined threshold as the address event, and outputs the detection result to the column arbiter 213. Note that the address event detection pixel 400 is an example of a detection pixel recited in claims.

[Configuration Example of Normal Pixel]

Figure 4:
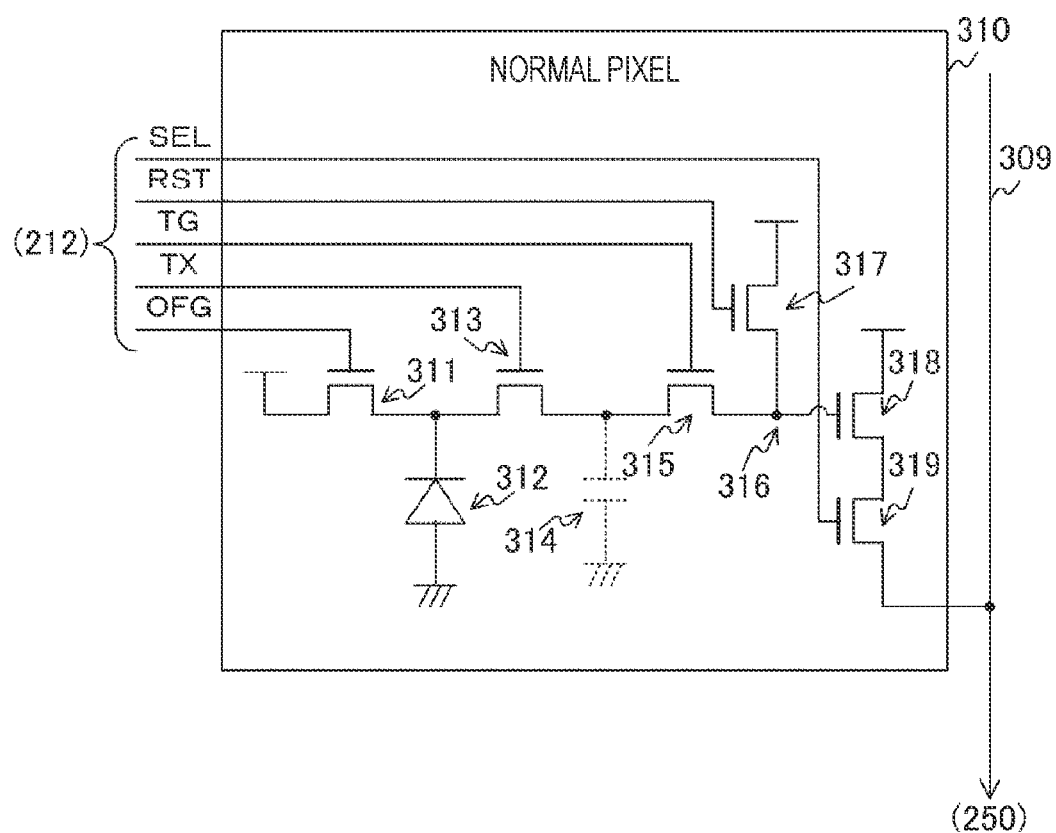
FIG. 4 is a circuit diagram illustrating a configuration example of a normal pixel in the first embodiment of the present technology.

FIG. 4 is a circuit diagram illustrating a configuration example of the normal pixel 310 in the first embodiment of the present technology. The normal pixel 310 is provided with a discharge transistor 311, a photodiode 312, transfer transistors 313 and 315, and an analog memory 314. Furthermore, the normal pixel 310 is provided with a floating diffusion layer 316, a reset transistor 317, an amplification transistor 318, and a selection transistor 319.

The discharge transistor 311 discharges electric charge accumulated in the photodiode 312 in accordance with a drive signal OFG from the drive circuit 212. The photodiode 312 generates the electric charge by photoelectric conversion.

The transfer transistor 313 transfers the electric charge from the photodiode 312 to the analog memory 314 in accordance with a transfer signal TX from the drive circuit 212. Note that the transfer transistor 315 is an example of a former stage transfer transistor recited in claims.

The analog memory 314 accumulates the electric charge. The analog memory 314 is established by wiring capacitance in principle; however, in order to enable electric charge transfer to the floating diffusion layer 316, embedded capacitance that enables complete depletion is desirably used. Note that the analog memory 314 is an example of a former stage electric charge accumulation unit recited in claims.

The transfer transistor 315 transfers the electric charge from the analog memory 314 to the floating diffusion layer 316 in accordance with a transfer signal TG from the drive circuit 212. Note that the transfer transistor 315 is an example of a latter stage transfer transistor recited in claims.

The floating diffusion layer 316 accumulates the transferred electric charge and generates a voltage corresponding to an amount of electric charge.

Note that the floating diffusion layer 316 is an example of a latter stage electric charge accumulation unit recited in claims.

The reset transistor 317 initializes the voltage of the floating diffusion layer 316 to a reset level in accordance with a reset signal RST from the drive circuit 212.

The amplification transistor 318 amplifies the voltage of the floating diffusion layer 316 and supplies the same as the pixel signal to the selection transistor 319.

The selection transistor 319 outputs the pixel signal to the column ADC 250 via a vertical signal line 309 in accordance with a selection signal SEL from the drive circuit 212.

Control timing of each of the discharge transistor 311, the transfer transistors 313 and 315, the reset transistor 317, and the selection transistor 319 described above is described later.

[Configuration Example of Column ADC]

Figure 5:
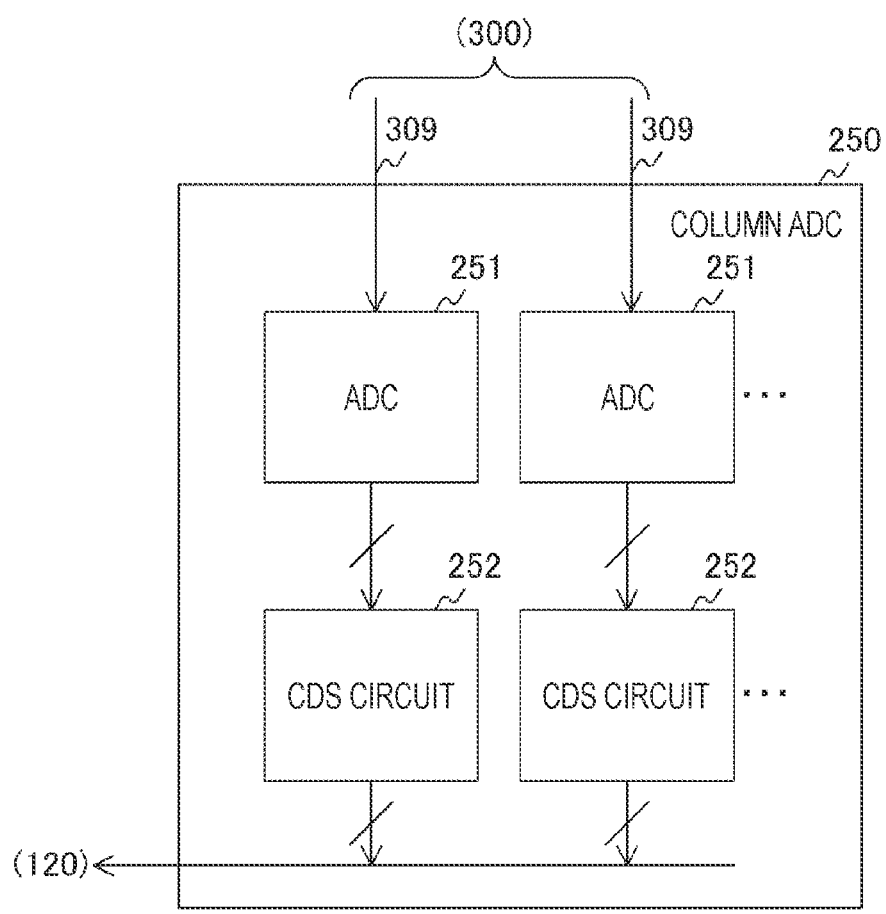
FIG. 5 is a block diagram illustrating a configuration example of a column analog-to-digital converter (ADC) in the first embodiment of the present technology.

FIG. 5 is a block diagram illustrating a configuration example of the column ADC 250 in the first embodiment of the present technology. The column ADC 250 is provided with a plurality of ADCs 251 and a plurality of CDS circuits 252. Each of the ADCs 251 and each of the CDS circuits 252 are arranged in every column. The pixel signals from the corresponding column are input to the ADC 251 via the vertical signal line 309. Note that, although one ADC 251 is arranged in every column, the configuration is not limited to this. For example, it is also possible to arrange a plurality of ADCs 251 in every column and read a plurality of rows in parallel.

The ADC 251 converts the pixel signal into a digital signal. For example, a single-slope ADC that counts until a comparison result between the reference signal from the DAC 211 and the pixel signal is inverted is used as the ADC 251. The ADC 251 supplies the digital signal to the corresponding CDS circuit 252. Note that the ADC 251 is an example of an analog-to-digital converter recited in claims.

The CDS circuit 252 performs CDS processing for obtaining a difference between the reset level and the signal level on the digital signal. Here, the reset level is a level of the pixel signal when the floating diffusion layer 316 in the normal pixel 310 is initialized, and the signal level is a level of the pixel signal according to an exposure amount. The CDS circuit 252 supplies data of the difference to the DSP circuit 120.

Note that, although the ADC 251 and the CDS circuit 252 are arranged separately, it may be configured that one circuit performs the AD conversion and the CDS processing. For example, a counter and a comparator that count down at the time of AD conversion of the reset level and count down at the time of AD conversion of the signal level may be arranged in place of the ADC 251 and the CDS circuit 252. Furthermore, although the column ADC 250 performs the CDS processing, it may also be configured that a circuit in a latter stage (DSP circuit 120) and the like performs the CDS processing in place of the column ADC 250. Furthermore, a signal amplifier may be arranged in a former stage of the ADC 251 to perform signal amplification before the AD conversion is performed.

[Configuration Example of Address Event Detection Pixel]

Figure 6:
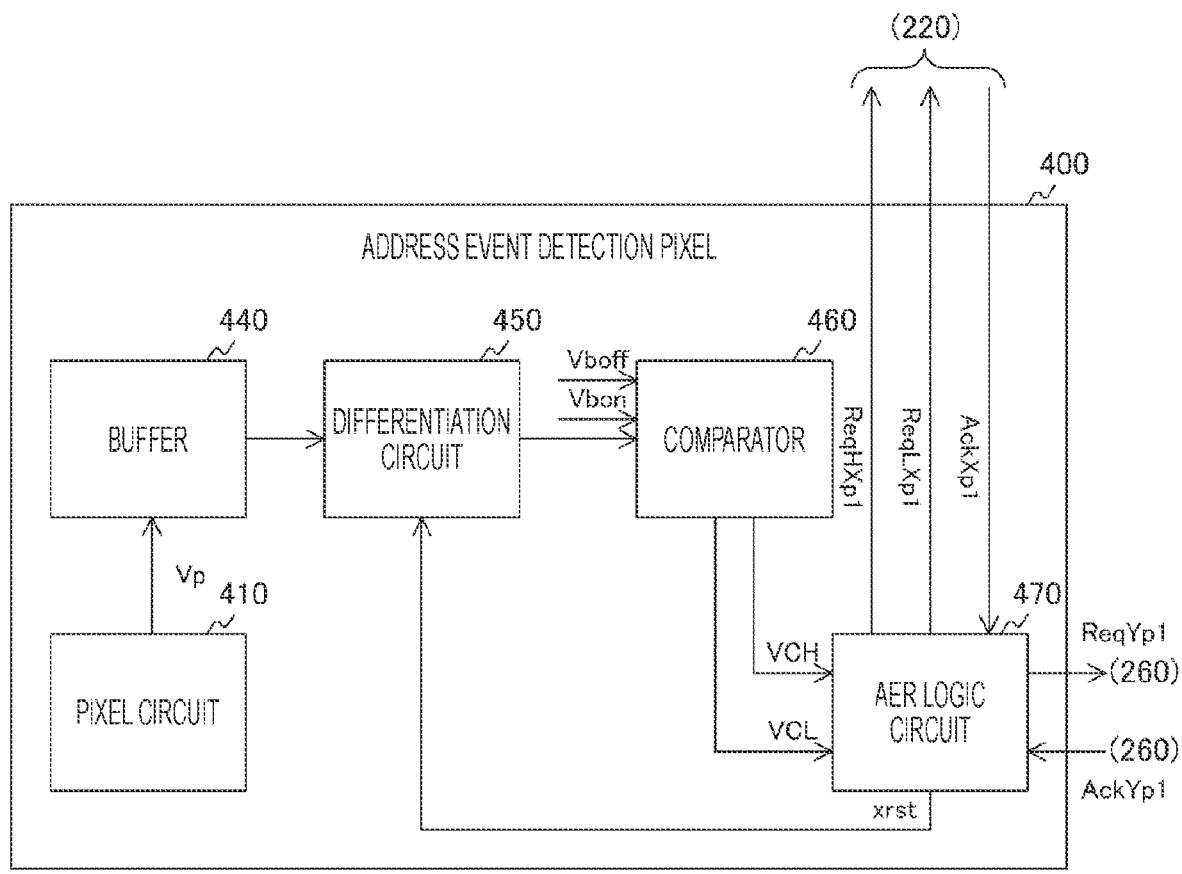
FIG. 6 is a block diagram illustrating a configuration example of an address event detection pixel in the first embodiment of the present technology.

FIG. 6 is a block diagram illustrating a configuration example of the address event detection pixel 400 in the first embodiment of the present technology. The address event detection pixel 400 is provided with a pixel circuit 410, a buffer 440, a differentiation circuit 450, a comparator 460, and an AER logic circuit 470.

The pixel circuit 410 generates a voltage signal Vp generated by performing current-voltage conversion on a photocurrent according to an amount of electric charge generated by the photoelectric conversion, and outputs the same to the buffer 440.

The buffer 440 includes, for example, a source follower, and is used for impedance conversion of the voltage signal Vp.

The differentiation circuit 450 includes, for example, a switched capacitor circuit, and obtains a differentiation signal corresponding to a change in Vp with respect to a reference value at the time of reset. The differentiation circuit 450 supplies the differentiation signal to the comparator 460.

The comparator 460 compares a level of the differentiation signal with thresholds Vbon and Vboff. The comparator 460 outputs a comparison result with the threshold Vbon to the AER logic circuit 470 as VCH, and outputs a comparison result with the threshold Vboff to the AER logic circuit 470 as VCL.

Here, the threshold Vbon is set to a value higher than the threshold Vboff. When the differentiation signal become higher than the threshold Vbon, this means that a fluctuation amount of an amount of received light of the address event detection pixel 400 becomes larger than a value corresponding to the threshold Vbon. Furthermore, when the differentiation signal becomes lower than the threshold Vboff, this means that the fluctuation amount of the amount of received light of the address event detection pixel 400 becomes smaller than a value corresponding to the threshold Vboff. For this reason, in a case where the differentiation signal becomes higher than the threshold Vbon, the on-event out of the address events is detected, and in a case where the differentiation signal becomes lower than the threshold Vboff, the off-event is detected.

The AER logic circuit 470 performs the handshake on the basis of the comparison results VCH and VCL. The AER logic circuit 470 detects presence or absence of the address event, and performs the handshake with the row AER circuit 260 in a case where the address event occurs. Next, the AER logic circuit 470 performs the handshake with the column AER circuit 220, and resets the differentiation circuit 450 by a reset signal xrst.

Figure 7:
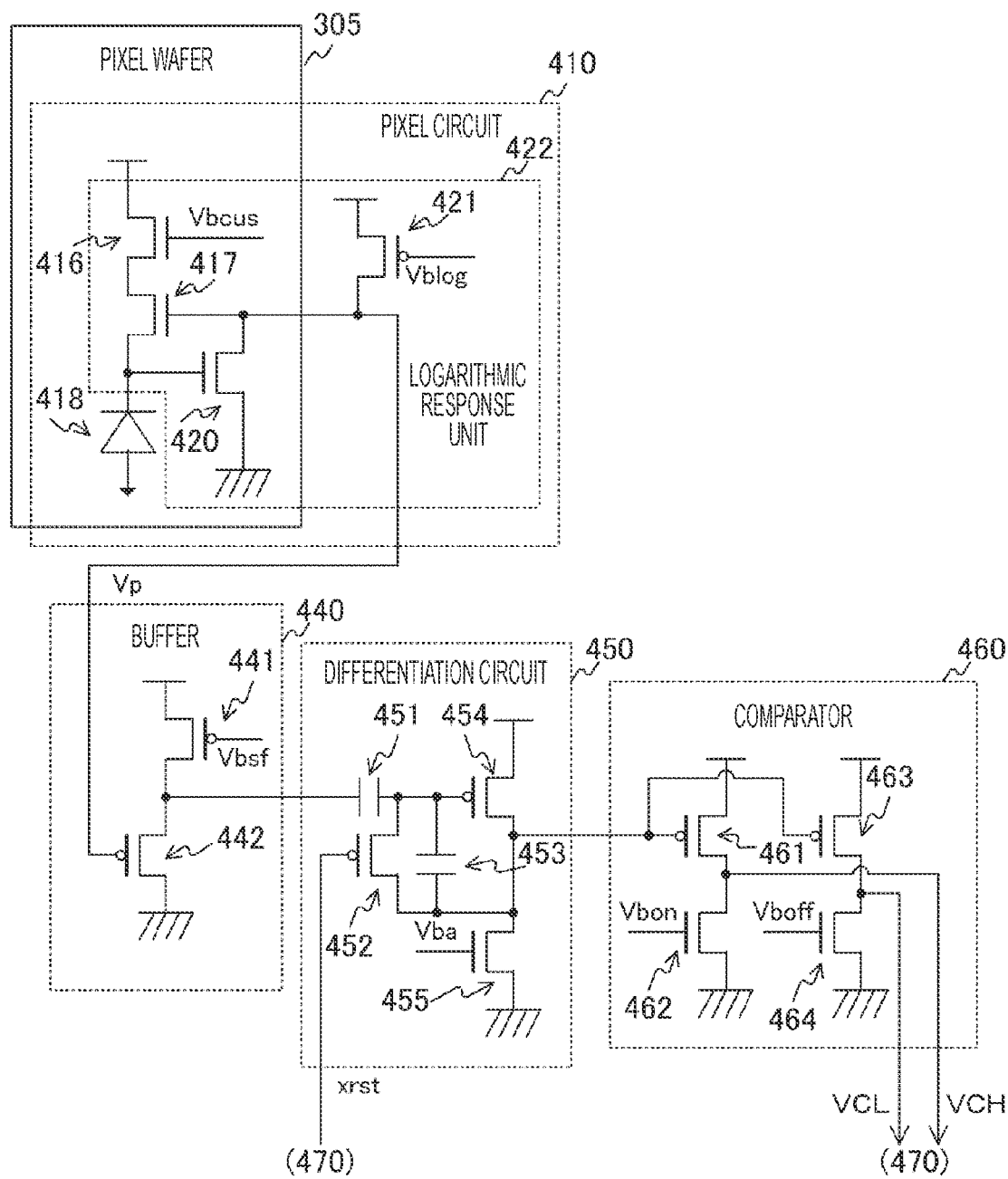
FIG. 7 is a circuit diagram illustrating a configuration example of a pixel circuit, a buffer, a differentiation circuit, and a comparator in the first embodiment of the present technology.

FIG. 7 is a circuit diagram illustrating a configuration example of the pixel circuit 410, the buffer 440, the differentiation circuit 450, and the comparator 460 in the first embodiment of the present technology.

The pixel circuit 410 is provided with a logarithmic response unit 422 and a photodiode 418. The logarithmic response unit 422 is provided with negative channel MOS (NMOS) transistors 416, 417, and 420, and a positive channel MOS (PMOS) transistor 421. The NMOS transistors 416 and 417 are connected in series between the power supply and the photodiode 418. Furthermore, the PMOS transistor 421 and the NMOS transistor 420 are connected in series between the power supply and a ground terminal.

Furthermore, a bias voltage Vbcus is applied to a gate of the NMOS transistor 416, and a bias voltage Vblog is applied to a gate of the PMOS transistor 421. A gate of the NMOS transistor 420 is connected to a connection point of the NMOS transistor 417 and the photodiode 418, and a gate of the NMOS transistor 417 is connected to a connection point of the NMOS transistor 420 and the PMOS transistor 421 and the buffer 440. With such connection, the photocurrent flowing through the photodiode 418 is logarithmically converted into the voltage signal Vp.

Furthermore, elements other than the PMOS transistor 421 of the pixel circuit 410 are provided on a pixel wafer 305.

Furthermore, the buffer 440 is provided with PMOS transistors 441 and 442 connected in series between the power supply and a ground terminal. A gate of the PMOS transistor 442 on a ground side is connected to the pixel circuit 410, and a bias voltage Vbsf is applied to a gate of the PMOS transistor 441 on a power supply side. Furthermore, a connection point of the PMOS transistors 441 and 442 is connected to the differentiation circuit 450. With this connection, impedance conversion of Vp is performed.

The differentiation circuit 450 is provided with capacitances 451 and 453, PMOS transistors 452 and 454, and an NMOS transistor 455.

One end of the capacitance 451 is connected to the buffer 440 and the other end thereof is connected to one end of the capacitance 453 and a gate of the PMOS transistor 454. The reset signal xrst is input to a gate of the PMOS transistor 452, and a source and a drain thereof are connected to both ends of the capacitance 453. The PMOS transistor 454 and the NMOS transistor 455 are connected in series between the power supply and a ground terminal. Furthermore, the other end of the capacitance 453 is connected to a connection point of the PMOS transistor 454 and the NMOS transistor 455. A bias voltage Vba is applied to a gate of the NMOS transistor 455 on a ground side, and the connection point of the PMOS transistor 454 and the NMOS transistor 455 is also connected to the comparator 460. With such connection, the differentiation signal is generated to be output to the comparator 460. Furthermore, the differentiation signal is initialized by the reset signal xrst.

The comparator 460 is provided with PMOS transistors 461 and 463 and NMOS transistors 462 and 464. The PMOS transistor 461 and the NMOS transistor 462 are connected in series between the power supply and a ground terminal, and the PMOS transistor 463 and the NMOS transistor 464 are also connected in series between the power supply and a ground terminal. Furthermore, gates of the PMOS transistors 461 and 463 are connected to the differentiation circuit 450. A bias voltage Vbon for generating the threshold Vbon is applied to a gate of the NMOS transistor 462, and a bias voltage Vboff for generating the threshold Vboff is applied to a gate of the NMOS transistor 464.

A connection point of the PMOS transistor 461 and the NMOS transistor 462 is connected to the AER logic circuit 470, and a voltage at this connection point is output as the comparison result VCH. A connection point of the PMOS transistor 463 and the NMOS transistor 464 is also connected to the AER logic circuit 470, and a voltage at this connection point is output as the comparison result VCL. With such connection, the comparator 460 outputs a high-level comparison result VCH in a case where the differentiation signal becomes higher than the threshold Vbon, and outputs a low-level comparison result VCL in a case where the differentiation signal becomes lower than the threshold Vboff.

Figure 8:
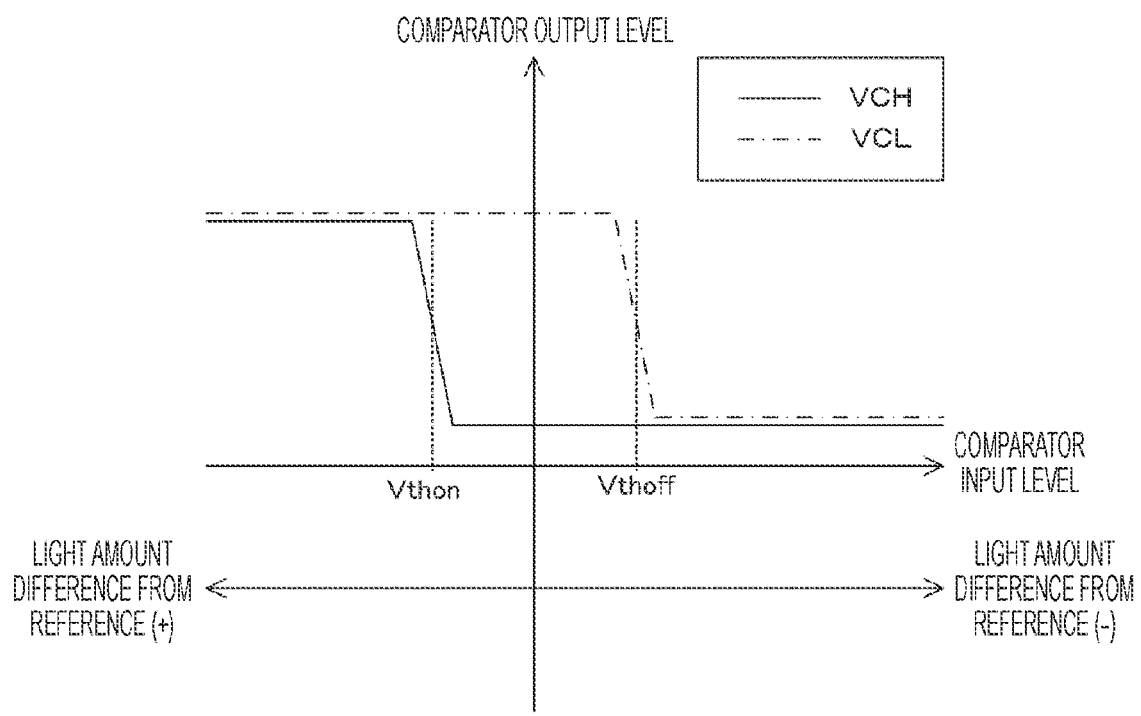
FIG. 8 is a graph illustrating an example of an input/output characteristic of the comparator in the first embodiment of the present technology.

FIG. 8 is a graph illustrating an example of an input/output characteristic of the comparator 460 in the first embodiment of the present technology. In the drawing, a level of an output signal (VCH or VCL) of the comparator 460 is plotted along the ordinate, and a level of an input signal (differentiation signal) of the comparator 460 is plotted along the abscissa. Furthermore, a solid line indicates a locus of the comparison result VCH, and a dashed-dotted line indicates a locus of the comparison result VCL.

With reference to a light amount when the differentiation signal is at "0" level, when a positive light amount difference (fluctuation amount) from the reference becomes larger than the value corresponding to the threshold Vbon, the comparison result VCH changes from the low level to the high level and the on-event is detected. In contrast, when a negative light amount difference from the reference becomes smaller than the value corresponding to the threshold Vboff, the comparison result VCL changes from the high level to the low level and the off-event is detected.

The DSP circuit 120 processes the detection result of each address event of the address event detection pixel 400 in various applications. Assumed applications include an image recognition input device for in-vehicle use or artificial intelligence use, surveillance applications and the like.

In a case of in-vehicle use, the normal image data imaged in synchronization with the vertical synchronization signal VSYNC is displayed for visual recognition by a driver. In contrast, the solid-state imaging element 200 outputs a signal when the address event occurs to a vehicle control system at a high speed in real time. Therefore, information that could be obtained only in a cycle of the vertical synchronization signal by a conventional solid-state imaging element may be detected as a signal of a change portion without waiting for an elapse of the cycle. For this reason, it is possible to speed up feedback until an instruction such as avoiding a person and an obstacle and improve safety.

Furthermore, in a case of artificial intelligence use, by inputting low-resolution meaningful information (for example, luminance difference of logarithmic compression) in place of high-resolution normal image data, there is an advantage that processing may be executed at a high speed and an arithmetic amount may be reduced. Furthermore, since the normal image data may also be obtained, for example, by using an arithmetic result obtained by performing signal processing using long short term memory (LSTM) on an event-driven output AER image data and the normal image data together, highly accurate image recognition may be realized.

For the surveillance applications, there are applications of operating in an event-driven manner at the time of normal operation and starting recording the high-resolution normal image data synchronized with the vertical synchronization signal in a case where a difference of a certain constant number or larger (event of a certain threshold or larger) occurs in the image, for example. Therefore, it is not necessary to constantly operate the high-resolution ADC, so that power consumption may be reduced.

[Configuration Example of AER Logic Circuit]

Figure 9:
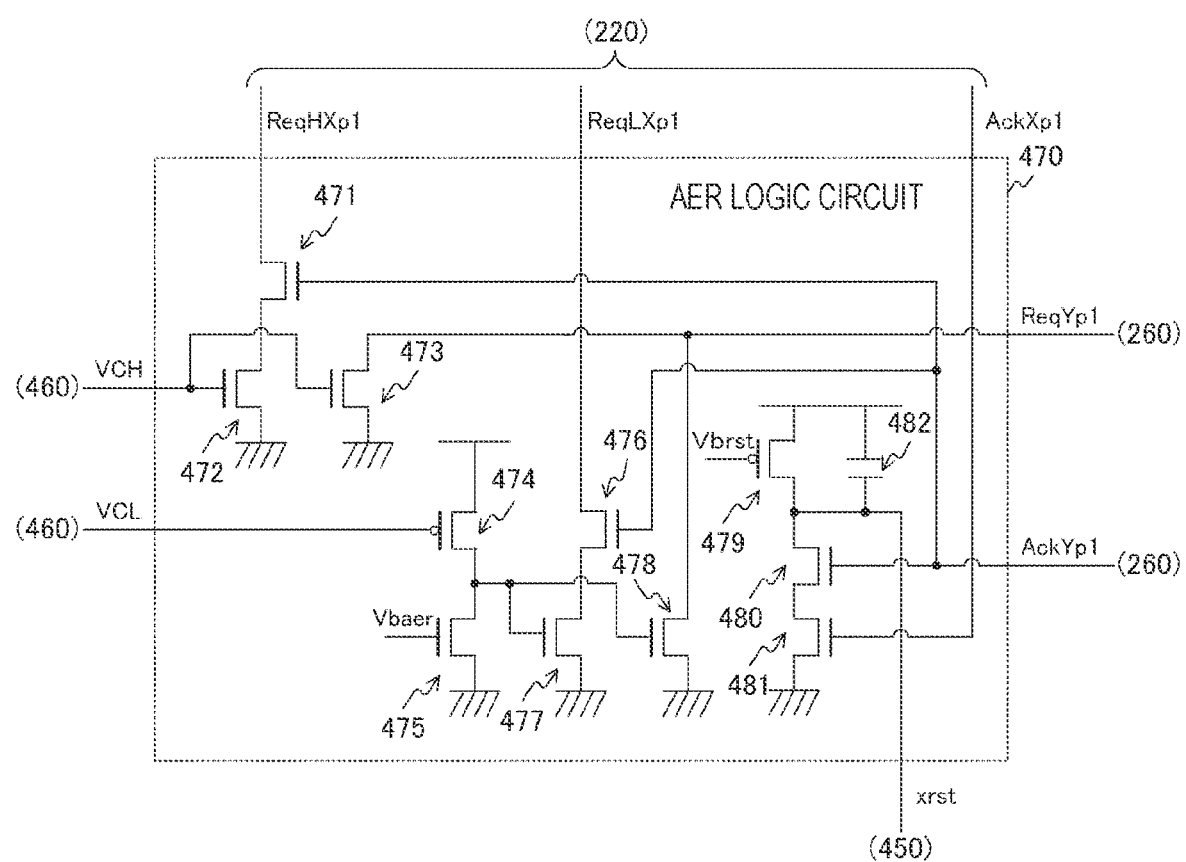
FIG. 9 is a block diagram illustrating a configuration example of an AER logic circuit in the first embodiment of the present technology.

FIG. 9 is a block diagram illustrating a configuration example of the AER logic circuit 470 in the first embodiment of the present technology. The AER logic circuit 470 is provided with NMOS transistors 471 to 473, 475 to 478, 480, and 481, PMOS transistors 474 and 479, and capacitance 482.

The NMOS transistors 471 and 472 are connected in series. The comparison result VCH is input to gates of the NMOS transistors 472 and 473, and a response AckYp1 is input to a gate of the NMOS transistor 471. Furthermore, sources of the NMOS transistors 472 and 473 are grounded, and a request ReqHXp1 is output from a drain of the NMOS transistor 471 to the column AER circuit 220. A request ReqYp1 is output from a drain of the NMOS transistor 473 to the row AER circuit 260.

The PMOS transistor 474 and the NMOS transistor 475 are connected in series between the power supply and a ground terminal. Furthermore, the comparison result VCL is input to a gate of the PMOS transistor 474, and a bias voltage Vbaer is applied to a gate of the NMOS transistor 475.

The NMOS transistors 476 and 477 are connected in series. Gates of the NMOS transistors 477 and 478 are connected to a connection point of the PMOS transistor 474 and the NMOS transistor 475. The response AckYp1 is input to a gate of the NMOS transistor 476. Furthermore, sources of the NMOS transistors 477 and 478 are grounded, and a request ReqLXp1 is output from a drain of the NMOS transistor 476 to the column AER circuit 220. The request ReqYp1 is output from a drain of the NMOS transistor 478 to the row AER circuit 260.

The PMOS transistor 479 and the NMOS transistors 480 and 481 are connected in series between the power supply and a ground terminal. Furthermore, a bias voltage Vbrst is applied to a gate of the PMOS transistor 479. The response AckYp1 is input to a gate of the NMOS transistor 480, and a response Ack41 is input to a gate of the NMOS transistor 481. One end of the capacitance 482 is connected to the power supply, and the other end thereof is connected to a connection point of the PMOS transistor 479 and the NMOS transistor 480. Furthermore, a voltage at the connection point of the PMOS transistor 479 and the NMOS transistor 480 is output to the differentiation circuit 450 as the reset signal xrst.

With the above-described configuration, when the high-level comparison result VCH is input (that is, the on-event is detected), the AER logic circuit 470 transmits a low-level request ReqYp1 to the row AER circuit 260. Then, upon receiving a high-level response AckYp1 from the row AER circuit 260, the AER logic circuit 470 transmits a low-level request ReqHXp1 to the column AER circuit 220. Then, upon receiving a high-level response AckXp1 from the column AER circuit 220, the AER logic circuit 470 outputs a low-level reset signal xrst to the differentiation circuit 450.

Furthermore, when the low-level comparison result VCL is input (that is, the off-event is detected), the AER logic circuit 470 transmits the low-level request ReqYp1 to the row AER circuit 260. Then, upon receiving the high-level response AckYp1 from the row AER circuit 260, the AER logic circuit 470 transmits a low-level request ReqLXp1 to the column AER circuit 220. Then, upon receiving a high-level response AckXp1 from the column AER circuit 220, the AER logic circuit 470 outputs a low-level reset signal xrst to the differentiation circuit 450.

[Configuration Example of Row AER Circuit]

Figure 10:
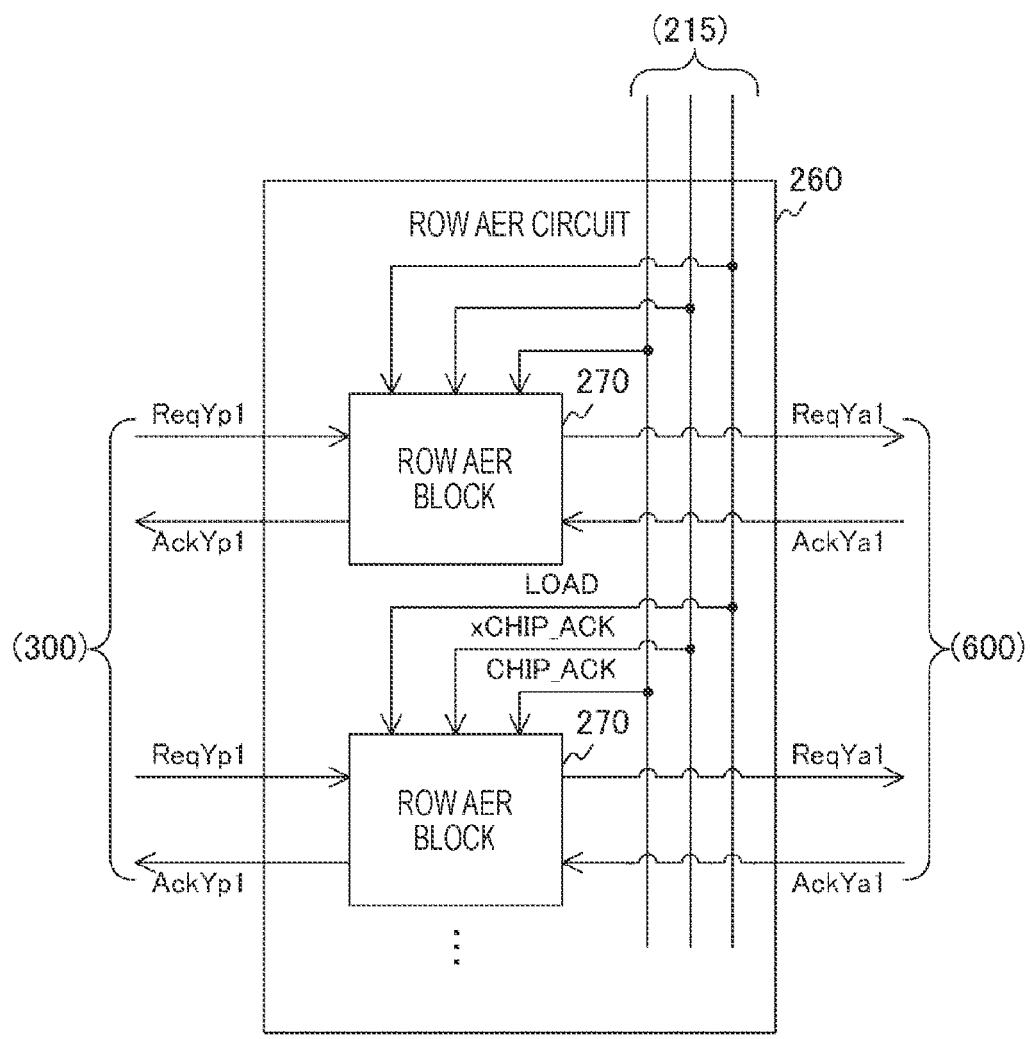
FIG. 10 is a block diagram illustrating a configuration example of a row AER circuit in the first embodiment of the present technology.

FIG. 10 is a block diagram illustrating a configuration example of the row AER circuit 260 in the first embodiment of the present technology. The row AER circuit 260 is provided with the row AER block 270 in every row. The row AER block 270 performs the handshake with the corresponding row, the row arbiter 600, and the state machine 215.

[Configuration Example of Row AER Block]

Figure 11:
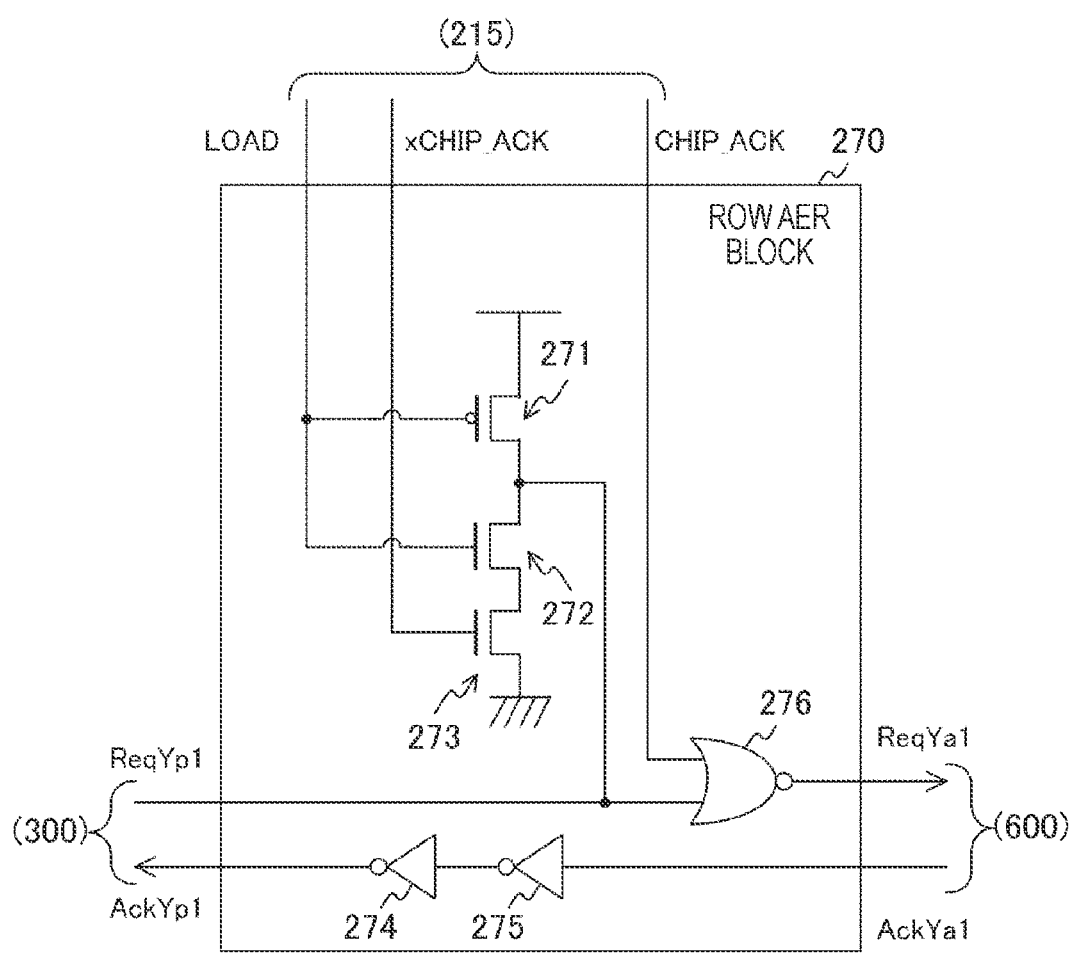
FIG. 11 is a circuit diagram illustrating a configuration example of a row AER block in the first embodiment of the present technology.

FIG. 11 is a circuit diagram illustrating a configuration example of the row AER block 270 in the first embodiment of the present technology. The row AER block 270 is provided with a PMOS transistor 271, NMOS transistors 272 and 273, a negative OR (NOR) gate 276, and inverters 274 and 275.

The PMOS transistor 271 and the NMOS transistors 272 and 273 are connected in series between the power supply and a ground terminal. Furthermore, a control signal LOAD from the state machine 215 is input to gates of the PMOS transistor 271 and the NMOS transistor 272. The control signal LOAD is a signal that indicates reading of the detection result of the address event. Furthermore, xCHIP_ACK obtained by inverting a response CHIP_ACK from the state machine 215 is input to a gate of the NMOS transistor 273.

The NOR gate 276 outputs a negative OR of two input values to the row arbiter 600 as a request ReqYa1. The response CHIP_ACK from the state machine 215 is input to one of input terminals of the NOR gate 276. The other of the input terminals of the NOR gate 276 is connected to a connection point of the PMOS transistor 271 and the NMOS transistor 272 and a signal line that transmits the request ReqYp1 from the pixel array unit 300.

The inverter 275 inverts a response AckYa1 from the row arbiter 600 and outputs the same to the inverter 274. The inverter 274 inverts the signal from the inverter 275 and outputs the same as the response AckYp1 to the pixel array unit 300.

With the above-described configuration, when the low-level request ReqYp1 is input, the row AER block 270 outputs a low-level request ReqYa1 if the response CHIP_ACK is at a high level. Furthermore, the row AER block 270 delays a high-level response AckYa1 and outputs the same as the response AckYp1.

[Configuration Example of Column AER Circuit]

Figure 12:
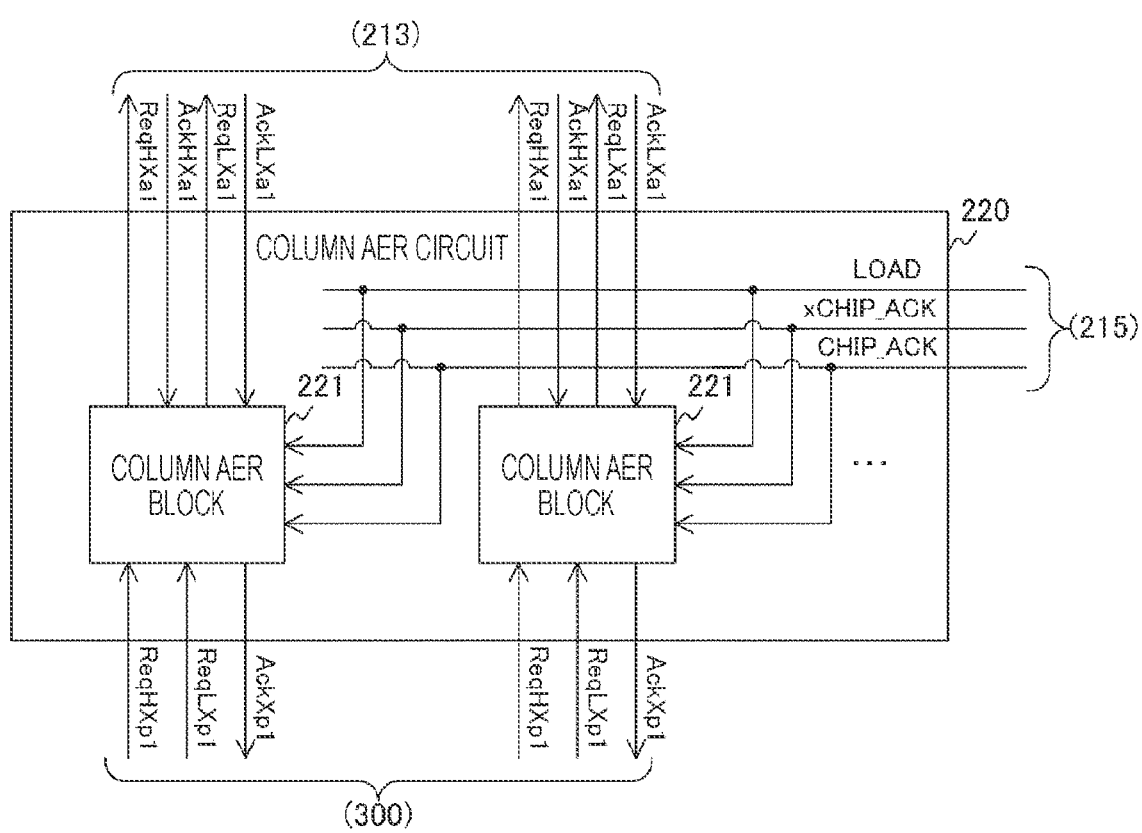
FIG. 12 is a block diagram illustrating a configuration example of a column AER circuit in the first embodiment of the present technology.

FIG. 12 is a block diagram illustrating a configuration example of the column AER circuit 220 in the first embodiment of the present technology. The column AER circuit 220 is provided with a column AER block 221 in every row. The column AER block 221 performs the handshake with the corresponding column, the state machine 215, and the column arbiter 213.

[Configuration Example of Column AER Block]

Figure 13:
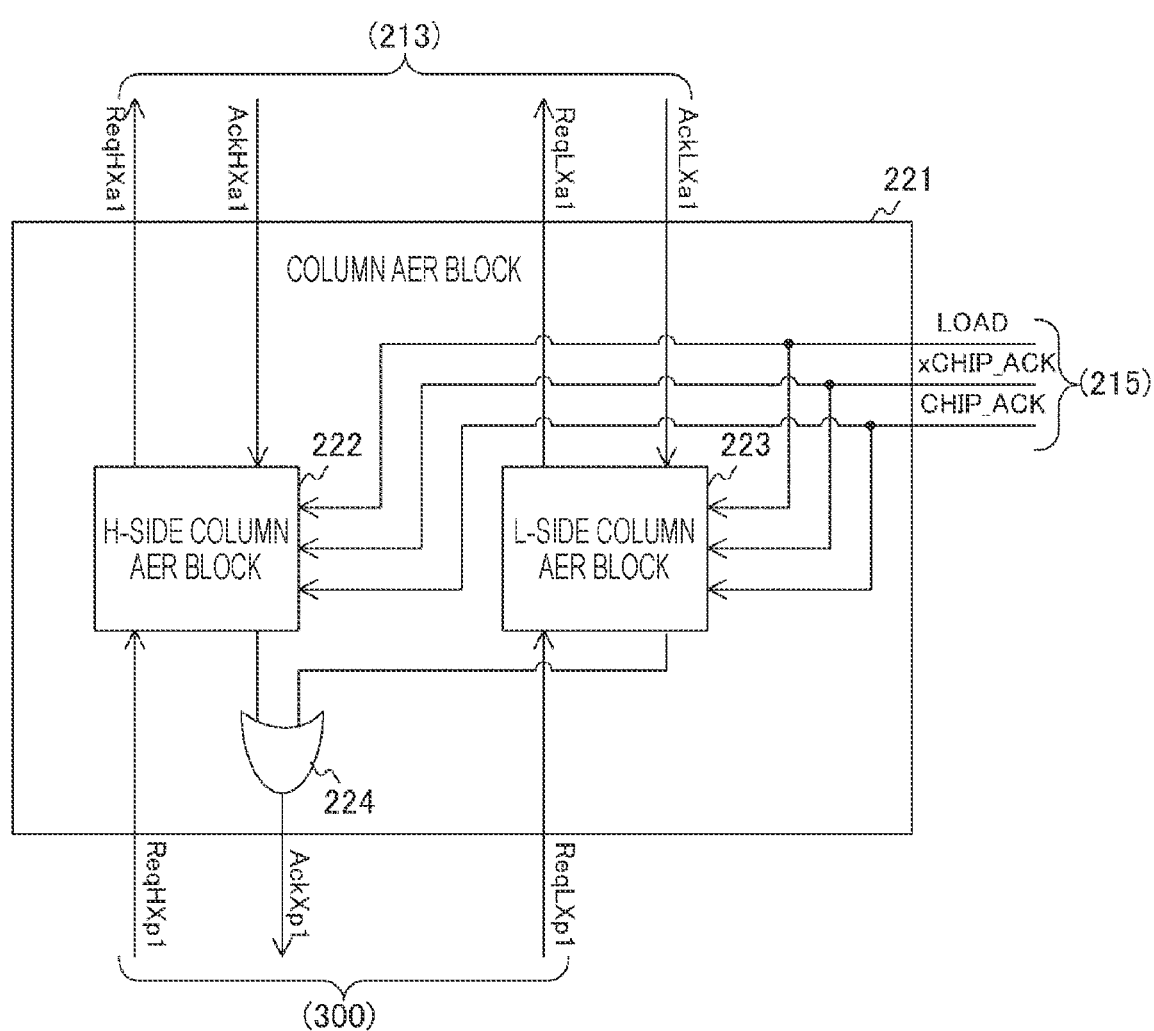
FIG. 13 is a block diagram illustrating a configuration example of a column AER block in the first embodiment of the present technology.

FIG. 13 is a block diagram illustrating a configuration example of the column AER block 221 in the first embodiment of the present technology. This column AER block 221 is provided with an H-side column AER block 222, an L-side column AER block 223, and a logical add (OR) gate 224.

The H-side column AER block 222 performs the handshake when the low-level request ReqHXp1 is input. The H-side column AER block 222 outputs a signal obtained by delaying a high-level response AckHXa1 to the OR gate 224. The L-side column AER block 223 performs the handshake when the low-level request ReqLXp1 is input. The L-side column AER block 223 outputs a signal obtained by delaying a high-level response AckLXa1 to the OR gate 224. Furthermore, the H-side column AER block 222 and the L-side column AER block 223 invert the low-level request from the pixel array unit 300. Configurations of the H-side column AER block 222 and the L-side column AER block 223 are similar to that of the row AER block 270 illustrated in FIG. 11. Note that the configurations of the row and column AER blocks are not limited to a circuit illustrated in FIG. 11 as long as the handshake may be performed.

The OR gate 224 outputs an OR of the signals from the H-side column AER block 222 and the L-side column AER block 223 as the response Ack41.

[Configuration Example of Row Arbiter]

Figure 14:
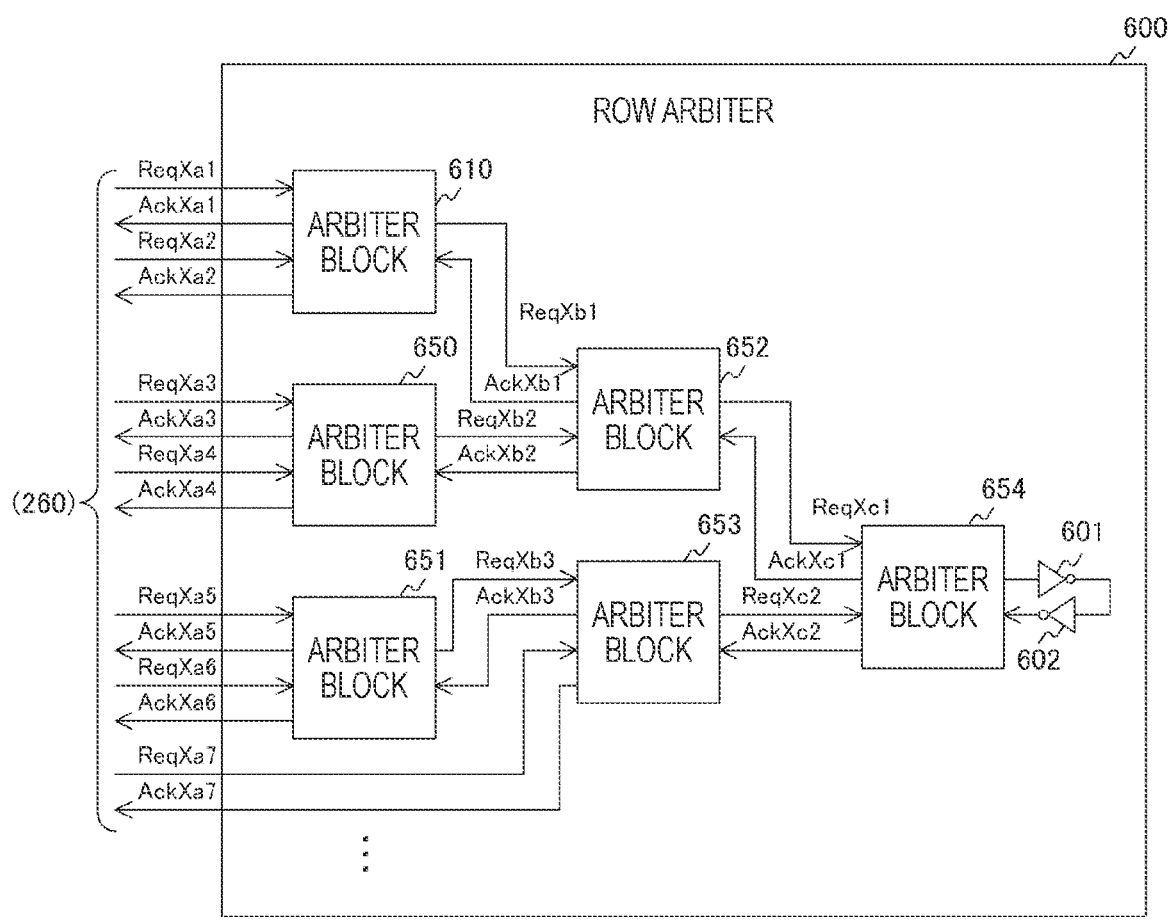
FIG. 14 is a block diagram illustrating a configuration example of a row arbiter in the first embodiment of the present technology.

FIG. 14 is a block diagram illustrating a configuration example of the row arbiter 600 in the first embodiment of the present technology. The row arbiter 600 is provided with arbiter blocks 610, 650 to 654 and inverters 601 and 602 in every seven rows. Note that this is a view in a case where the number of vertical event-driven pixels is seven. For example, if the number of vertical event-driven pixels is 1000, a 10-stage arbiter that covers up to 210 (=1024) stages is provided.

The arbiter block 610 arbitrates a request from a first row and a request from a second row. The arbiter block 610 performs the handshake with the arbiter block 652 and outputs a response to the first or second row on the basis of an arbitration result. The arbiter block 650 arbitrates a request from a third row and a request from a fourth row. The arbiter block 650 performs the handshake with the arbiter block 652 and outputs a response to the third or fourth row on the basis of an arbitration result.

The arbiter block 651 arbitrates a request from a fifth row and a request from a sixth row. The arbiter block 651 performs the handshake with the arbiter block 653 and outputs a response to the fifth or sixth row on the basis of an arbitration result.

The arbiter block 652 arbitrates a request from the arbiter block 610 and a request from the arbiter block 650. The arbiter block 652 performs the handshake with the arbiter block 654 and outputs a response to the arbiter block 610 or 650 on the basis of an arbitration result.

The arbiter block 653 arbitrates a request from the arbiter block 651 and a request from a seventh row. The arbiter block 653 performs the handshake with the arbiter block 654 and outputs a response to the arbiter block 651 or the seventh row on the basis of an arbitration result.

The arbiter block 654 arbitrates a request from the arbiter block 652 and a request from the arbiter block 653. The arbiter block 654 delays a response to an earlier request by the inverters 601 and 602 to supply to the arbiter block 652 or 653.

Note that a configuration of the column arbiter 213 is similar to that of the row arbiter 600. Furthermore, the configurations of the arbiters are not limited to the configuration illustrated in FIG. 14 as long as the request may be arbitrated.

[Configuration Example of Arbiter Block]

Figure 15:
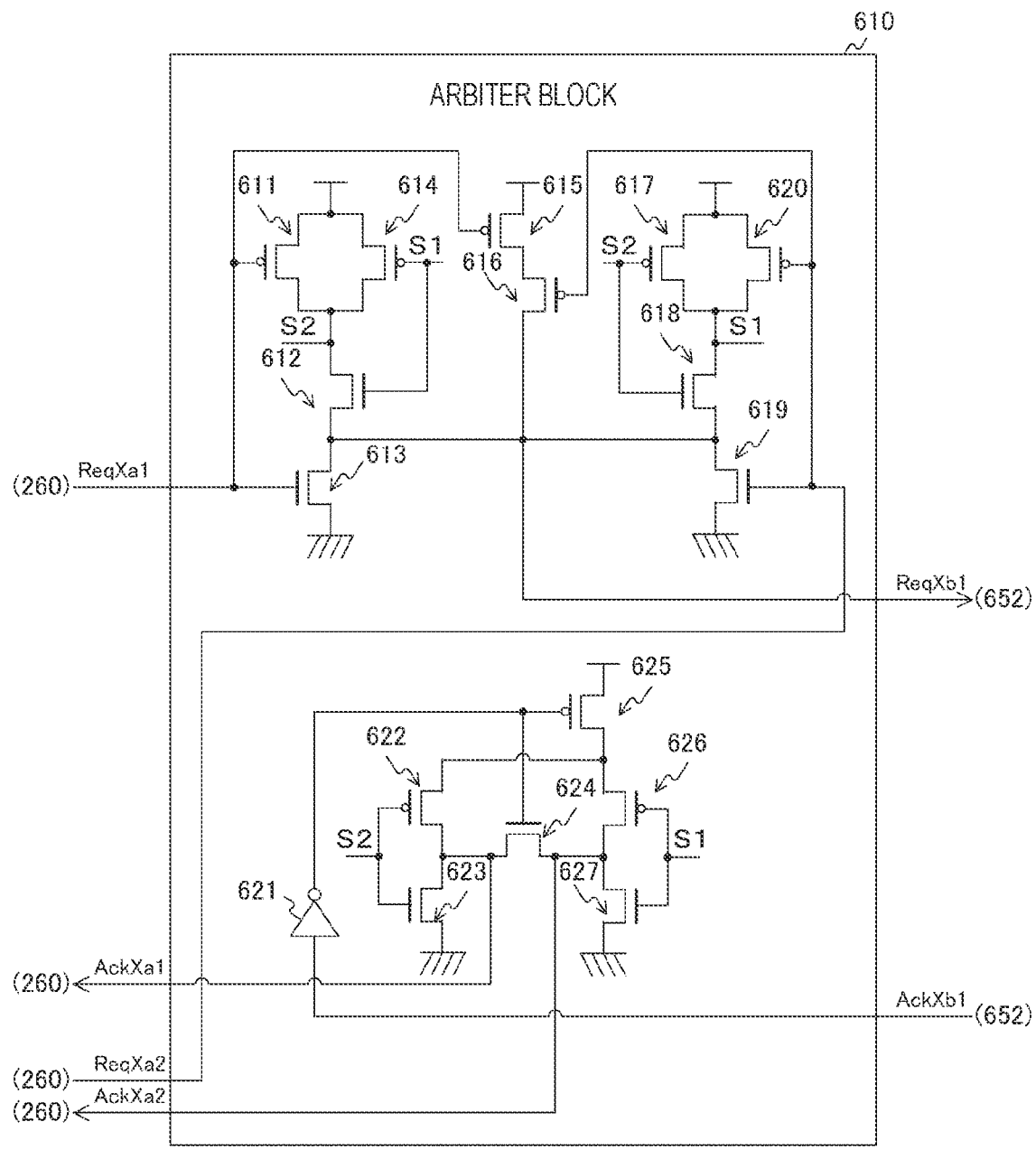
FIG. 15 is a circuit diagram illustrating a configuration example of an arbiter block in the first embodiment of the present technology.

FIG. 15 is a circuit diagram illustrating a configuration example of the arbiter block 610 in the first embodiment of the present technology. The arbiter block 610 is provided with PMOS transistors 611, 614, 615 to 617, 620, 622, 625, and 626, NMOS transistors 612, 613, 618, 619, 623, 624 to 627, and an inverter 621.

The PMOS transistors 611 and 614 are connected in parallel to the power supply. The NMOS transistors 612 and 613 are connected in series between drains of the PMOS transistors 611 and 614 and a ground terminal. Furthermore, a request ReqXa1 from the first row is input to gates of the PMOS transistor 611 and the NMOS transistor 613.

The PMOS transistors 615 and 616 are connected in series to the power supply. Furthermore, the request ReqXa1 is input to a gate of the PMOS transistor 615 and a request ReqXa2 from the second row is input to a gate of the PMOS transistor 616.

The PMOS transistors 617 and 620 are connected in parallel to the power supply. The NMOS transistors 618 and 619 are connected in series between drains of the PMOS transistors 617 and 620 and a ground terminal. Furthermore, gates of the PMOS transistor 617 and the NMOS transistor 618 are connected to the drains of the PMOS transistors 611 and 614. The request ReqXa2 is input to gates of the PMOS transistor 620 and the NMOS transistor 619. The drains of the PMOS transistors 617 and 620 are connected to gates of the PMOS transistor 614 and the NMOS transistor 612.

Furthermore, a connection point of the NMOS transistors 612 and 613, a drain of the PMOS transistor 616, and a connection point of the NMOS transistors 618 and 619 are connected to a signal line that transmits a request ReqXb1. The request ReqXb1 is output to a higher-order arbiter block 652.

The inverter 621 inverts a response AckXb1 from the higher-order arbiter block 652. The inverter 621 outputs the inverted signal to gates of the PMOS transistor 625 and the NMOS transistor 624.

The PMOS transistors 625 and 626 and the NMOS transistor 627 are connected in series between the power supply and a ground terminal. Furthermore, the PMOS transistor 622 and the NMOS transistor 623 are connected in series between a connection point of the PMOS transistors 625 and 626 and a ground terminal. A source and a drain of the NMOS transistor 624 are connected to a connection point of the PMOS transistor 622 and the NMOS transistor 623 and a connection point of the PMOS transistor 626 and the NMOS transistor 627.

Furthermore, gates of the PMOS transistor 622 and the NMOS transistor 623 are connected to the drains of the PMOS transistors 611 and 614. Gates of the PMOS transistor 626 and the NMOS transistor 627 are connected to the drains of the PMOS transistors 617 and 620. The connection point of the PMOS transistor 622 and the NMOS transistor 623 is connected to a signal line that transmits a response AckXa1 to the first row. The connection point of the PMOS transistor 626 and the NMOS transistor 627 is connected to a signal line that transmits a response AckXa2 to the second row.

With the above-described configuration, the arbiter block 610 outputs the request ReqXb1 when receiving the request ReqXb1 or a request ReqXb2. Then, upon receiving the response AckXb1, the arbiter block 610 outputs the response corresponding to one of the request ReqXb1 and the request ReqXb2 that arrives earlier.

Configurations of the arbiter blocks 650 to 654 are similar to that of the arbiter block 610 illustrated in FIG. 15.

Figure 16:
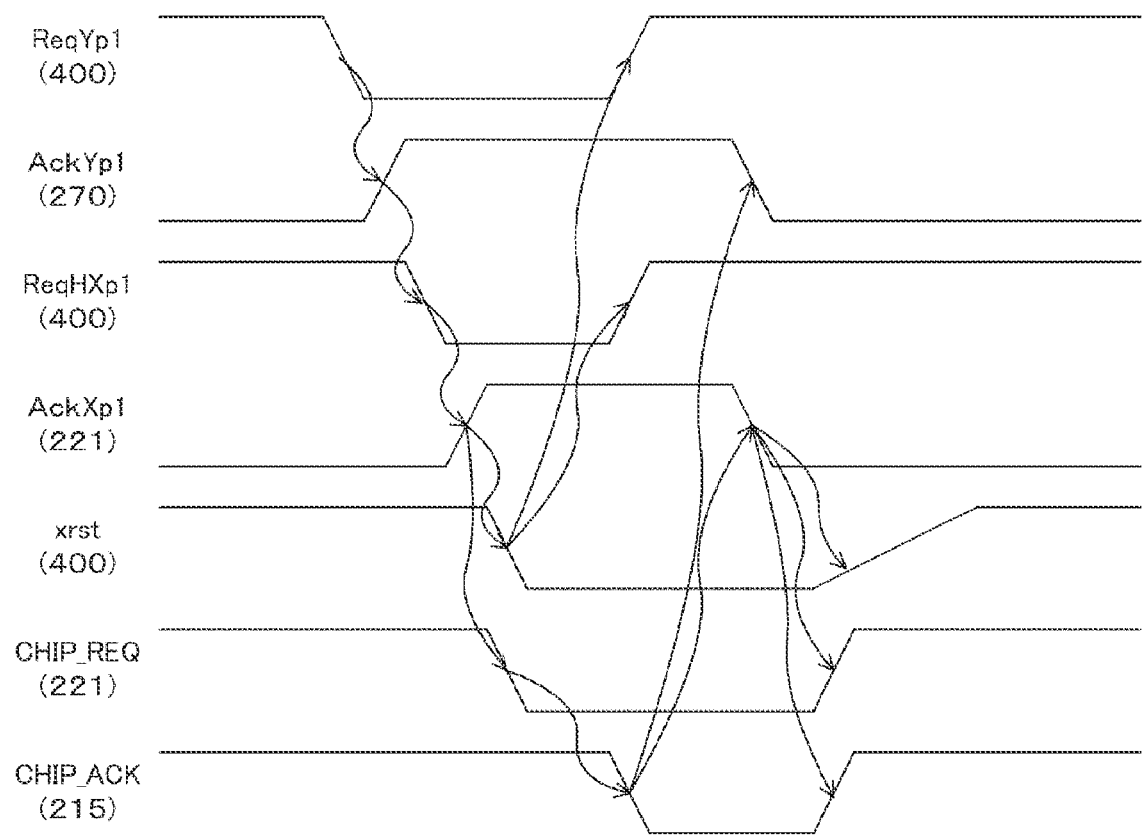
FIG. 16 is a timing chart illustrating an example of a handshake in the first embodiment of the present technology.

FIG. 16 is a timing chart illustrating an example of the handshake in the first embodiment of the present technology. When the address event detection pixel 400 outputs the low-level request ReqYp1, the row AER block 270 returns the high-level response AckYp1 if the response CHIP_ACK is at a high level.

Upon receiving the response AckYp1, the address event detection pixel 400 outputs the low-level request ReqHXp1 in a case where the on-event occurs. Note that, in a case where the off-event occurs, the low-level request ReqLXp1 is output.

Upon receiving the request ReqHXp1, the column AER block 221 returns the high-level response AckXp1 when the response CHIP_ACK is at a high level. Upon receiving the response AckXp1, the address event detection pixel 400 generates the low-level reset signal xrst to initialize the requests ReqYp1 and ReqHXp1 to a high level.

Furthermore, when outputting the response Ack41, the column AER block 221 outputs a low-level request CHIP_REQ. Upon receiving the request CHIP_REQ, the state machine 215 transfers the detection result of the address event to the DSP circuit 120 and returns a low-level response CHIPACK.

Upon receiving the response CHIP_ACK, the row AER block 270 initializes the response AckYp1 to a low level when the request ReqYp1 is at a high level. Furthermore, upon receiving the response CHIPACK, the column AER block 221 initializes the response Ack41 to a low level when the request ReqHXp1 is at a high level.

When the response Ack41 is initialized, the address event detection pixel 400 initializes the reset signal xrst to a high level, and the column AER block 221 initializes the request CHIP_REQ to a high level. Furthermore, the state machine 215 initializes the response CHIP_ACK to a high level.

Figure 17:
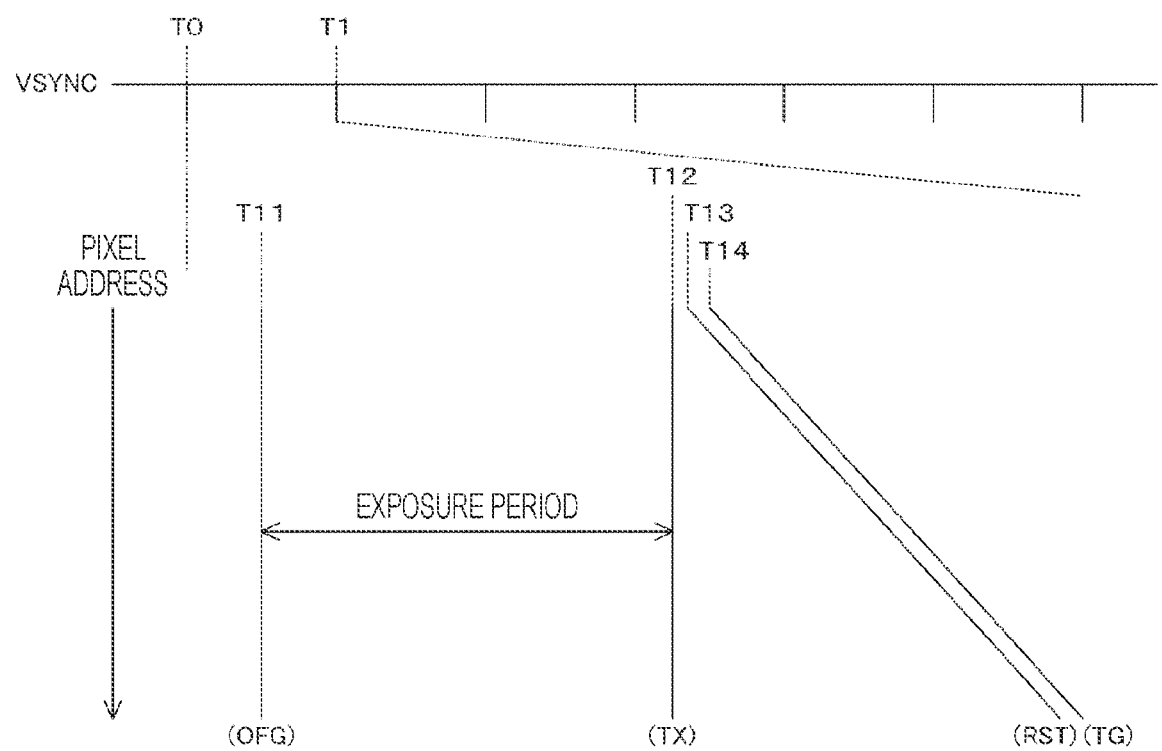
FIG. 17 is a timing chart illustrating an example of an imaging operation of the solid-state imaging element in the first embodiment of the present technology.

FIG. 17 is a timing chart illustrating an example of an imaging operation of the solid-state imaging element 200 in the first embodiment of the present technology.

The vertical synchronization signal VSYNC falls at a predetermined cycle, for example, at timing T0 and timing T1. The drive circuit 212 supplies the drive signal OFG to all the normal pixels 310 at timing T11 synchronized with the vertical synchronization signal VSYNC to start exposure. Then, the drive circuit 212 supplies the transfer signal TX to all the normal pixels 310 at timing T12 synchronized with the vertical synchronization signal VSYNC to finish the exposure.

Note that, in the drawing, timing T11 and timing T12 to start the exposure are set within the cycle of the vertical synchronization signal VSYNC, but the configuration is not limited to this. For example, the exposure may be started at timing T11 between timing T0 and timing T1 at which the vertical synchronization signal VSYNC falls next, and the exposure may be finished at timing after timing T1.

Next, the drive circuit 212 sequentially selects the rows by the selection signal SEL. The drive circuit 212 sequentially supplies the drive signal OFG and the transfer signal TG to the selected row to allow the same to sequentially output the reset level and the signal level. For example, the drive circuit 212 supplies the drive signal OFG to a first row at timing T13 to allow the same to output the reset level, and supplies the transfer signal TG to the first row at timing T14 to allow the same to output the signal level.

Note that, although the drive circuit 212 performs global shutter control to expose all the pixels at the same time, this may also perform rolling shutter control to sequentially expose the rows.

[Operation Example of Solid-state Imaging Element]

Figure 18:
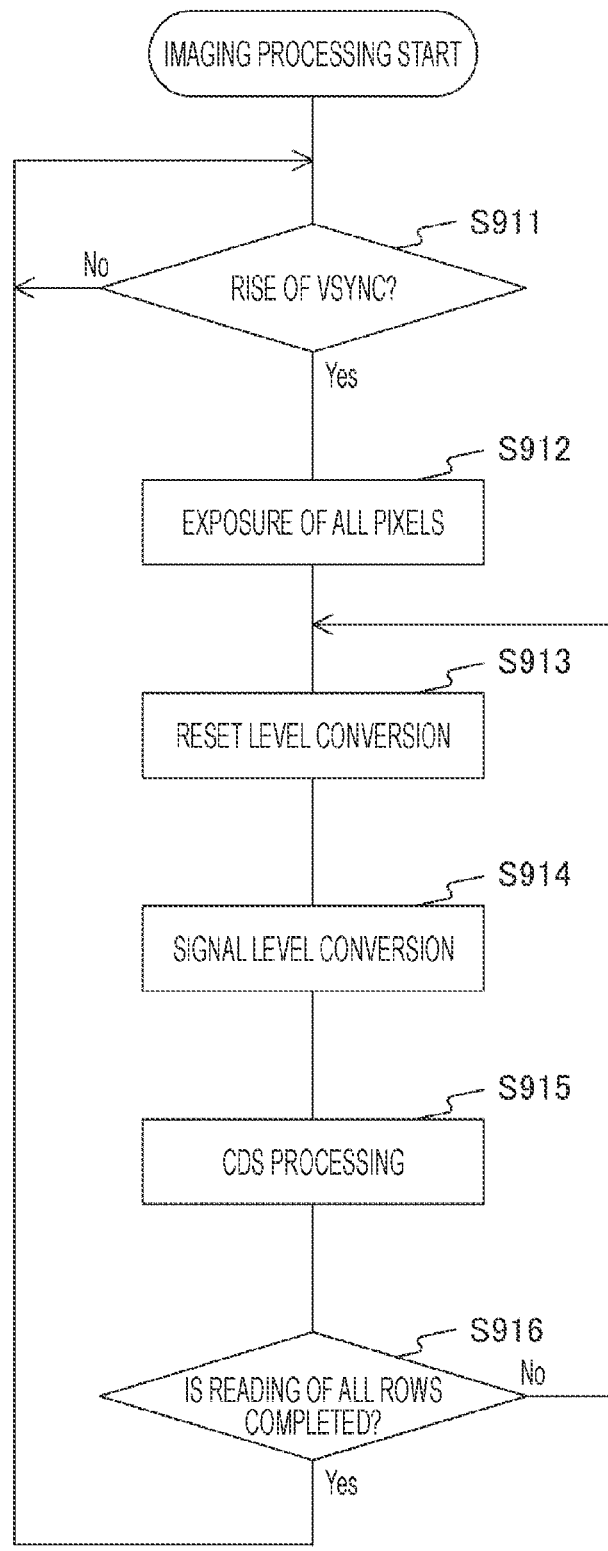
FIG. 18 is a flowchart illustrating an example of imaging processing in the first embodiment of the present technology.

FIG. 18 is a flowchart illustrating an example of imaging processing in the first embodiment of the present technology. The imaging processing is started, for example, when an application for imaging the normal image data is executed.

The solid-state imaging element 200 determines whether or not it is falling timing of VSYNC (step S911). In a case where it is the falling timing of VSYNC (step S911: Yes), the drive circuit 212 exposes all the pixels over an exposure period (step S912).

Then, the drive circuit 212 selects the row and allows the same to output the reset level, and the column ADC 250 AD converts the reset level (step S913). Then, the drive circuit 212 allows the selected row to output the signal level, and the column ADC 250 AD converts the signal level (step S914). The column ADC 250 performs the CDS processing (step S015).

The drive circuit 212 determines whether or not the reading of all the rows is completed (step S916). In a case where the reading of not all the rows is completed (step S916: No), the solid-state imaging element 200 repeatedly executes step S913 and subsequent steps. In contrast, in a case where the reading of all the rows is completed (step S916: Yes), the solid-state imaging element 200 repeatedly executes step S911 and subsequent steps.

Figure 19:
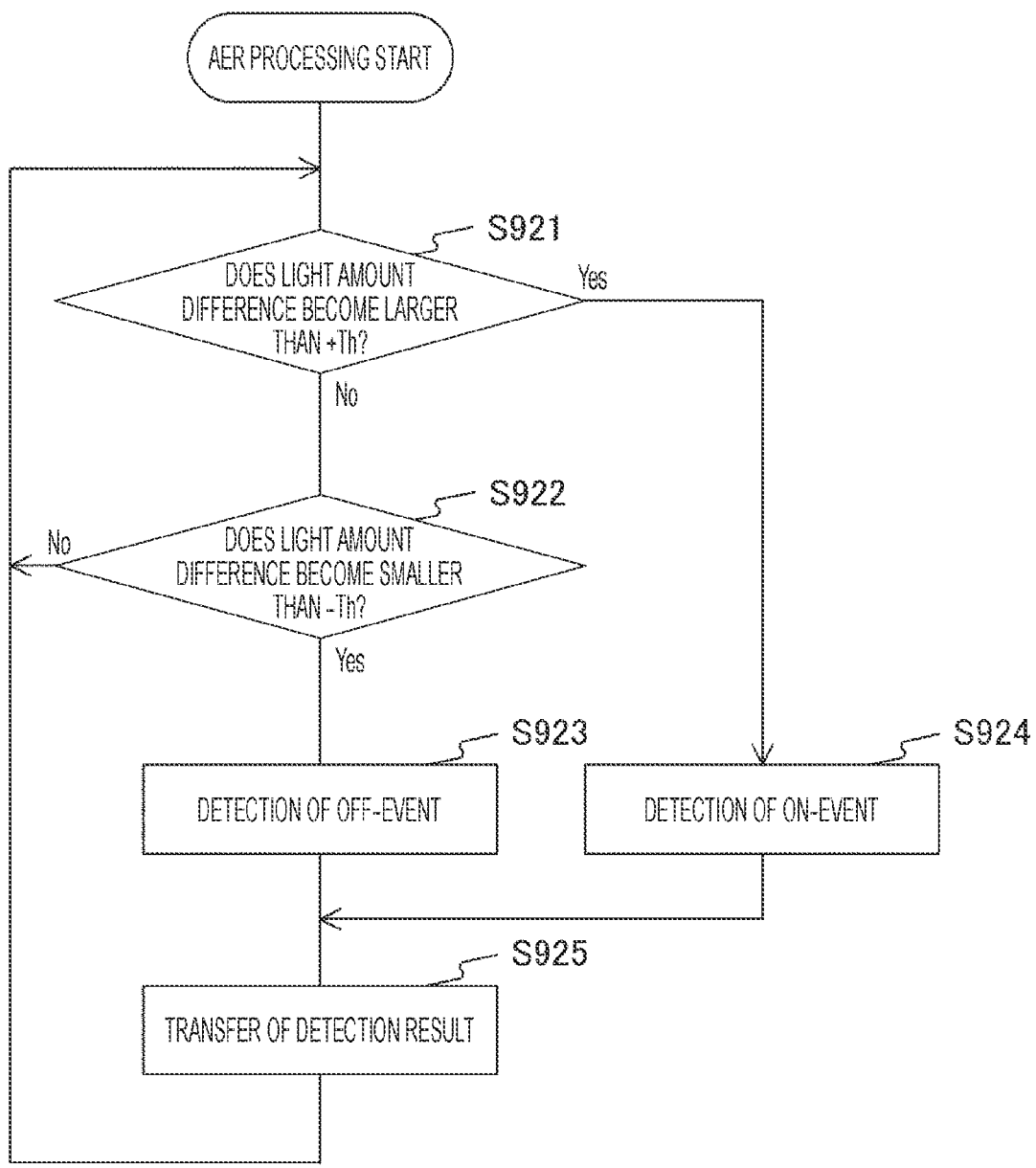
FIG. 19 is a flowchart illustrating an example of AER processing in the first embodiment of the present technology.

FIG. 19 is a flowchart illustrating an example of AER processing in the first embodiment of the present technology. The AER processing is started, for example, when an application for AER is executed.

The address event detection pixel 400 in the solid-state imaging element 200 determines whether or not the light amount difference becomes larger than a value +Th corresponding to the threshold Vbon (step S921). In a case where the light amount difference is +Th or smaller (step S921: No), the address event detection pixel 400 determines whether or not the light amount difference becomes smaller than a value −Th corresponding to the threshold Vboff (step S922). In a case where the light amount difference is smaller than −Th (step S922: Yes), the address event detection pixel 400 detects the off-event (step S923). In contrast, in a case where the light amount difference becomes larger than +Th (step S921: Yes), the address event detection pixel 400 detects the on-event (step S924).

After step S923 or S924, the address event detection pixel 400 transfers the detection result of the address event by the handshake (step S925), and repeatedly executes step S921 and subsequent steps. Furthermore, in a case where the light amount difference is −Th or larger (step S922: No), the address event detection pixel 400 repeatedly executes step S921 and subsequent steps.

Note that, although the address event detection pixel 400 does not output the pixel signal including color information, the pixel signal including the color information may further be output as illustrated in FIGS. 20A and 20B. In this case, for example, a circuit similar to that of the normal pixel 310 may be further added in the address event detection pixel 400. Furthermore, in a case where the address event detection pixel 400 outputs the pixel signal, the pixel signal of G may be output as illustrated in a of the drawing, or the pixel signals of R, G, and B may be output as illustrated in b of the drawing.

Furthermore, the address event detection pixel 400 is arranged in any of two rows by two columns, and the normal pixels 310 are arranged in the rest, but the arrangement is not limited to this. As illustrated in FIGS. 21A and 21B, it is also possible to arrange the address event detection pixels 400 of two rows by two columns and arrange the normal pixels 310 of two rows by two columns so as to be adjacent to them. In this case, it is possible to configure that the address event detection pixel 400 does not output the pixel signal including the color information as illustrated in a of the drawing, or configure that the pixel signal including the color information is further output as illustrated in b of the drawing.

In this manner, according to the first embodiment of the present technology, since the normal pixel 310 outputs the pixel signal while the address event detection pixel 400 detects the address event, it is possible to generate high-quality normal image data while detecting the address event. Furthermore, by arranging the ADC 251 in every column, it is not necessary to arrange the ADC in the normal pixel 310. Therefore, a circuit scale of the normal pixel 310 may be reduced as compared with a case where the ADC is arranged in all the normal pixels 310.

2. Second Embodiment

In the second embodiment described above, six transistors are arranged in every normal pixel 310, but as the number of pixels increases, the circuit scale of the pixel array unit 300 increases. A solid-state imaging element 200 in a second embodiment is different from that in the first embodiment in that a circuit scale of a normal pixel 310 is reduced.

Figure 22:
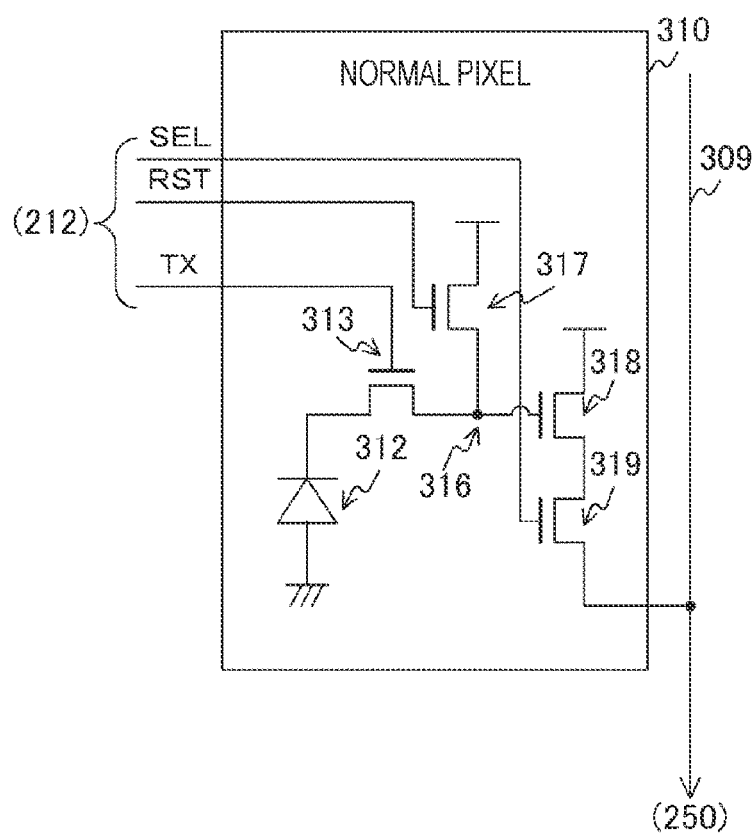
FIG. 22 is a circuit diagram illustrating a configuration example of a normal pixel in a second embodiment of the present technology.

FIG. 22 is a circuit diagram illustrating a configuration example of the normal pixel 310 in the second embodiment of the present technology. The normal pixel 310 is different from that in the first embodiment in that a discharge transistor 311, an analog memory 314, and a transfer transistor 315 are not arranged.

Furthermore, a transfer transistor 313 in the second embodiment transfers electric charge from a photodiode 312 to a floating diffusion layer 316 in accordance with a transfer signal TX.

Figure 23:
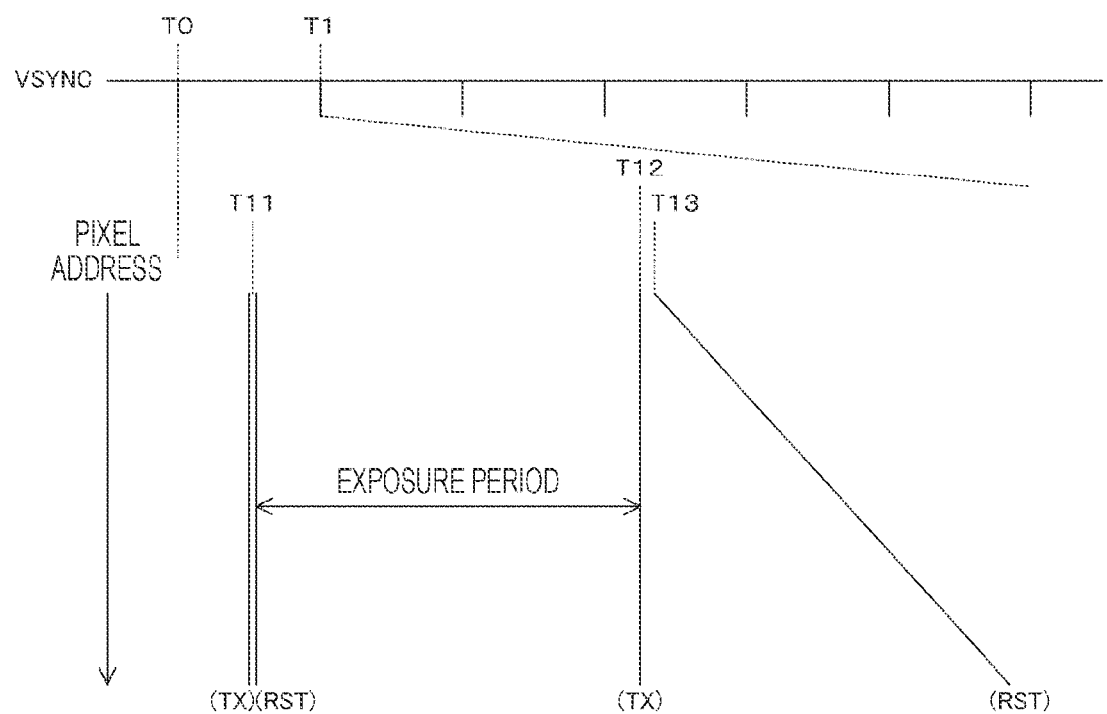
FIG. 23 is a timing chart illustrating an example of an imaging operation of a solid-state imaging element in the second embodiment of the present technology.

FIG. 23 is a timing chart illustrating an example of an imaging operation of the solid-state imaging element 200 in the second embodiment of the present technology.

The drive circuit 212 supplies the transfer signal TX and a reset signal RST to all the normal pixels 310 at timing T11 synchronized with a vertical synchronization signal VSYNC to start exposure. Then, the drive circuit 212 supplies the transfer signal TX to all the normal pixels 310 at timing T12 synchronized with the vertical synchronization signal VSYNC to finish the exposure.

Next, the drive circuit 212 sequentially selects the rows by the selection signal SEL. The drive circuit 212 supplies the reset signal RST to the selected row, and allows the same to sequentially output the signal level and the reset level. For example, the drive circuit 212 allows a first row to output the signal level at timing T12 and supplies the reset signal RST to the first row at timing T13 to allow the same to output the reset level.

In this manner, according to the second embodiment of the present technology, since the discharge transistor 311, the analog memory 314, and the transfer transistor 315 in the normal pixel 310 are cut, the circuit scale may be reduced as compared with that in the first embodiment in which they are arranged.

3. Application Example to Mobile Body

The technology according to the present disclosure (present technology) is applicable to various products. For example, the technology according to the present disclosure may also be realized as a device mounted on any type of mobile body such as an automobile, an electric automobile, a hybrid electric automobile, a motorcycle, a bicycle, a personal mobility, an airplane, a drone, a ship, and a robot.

Figure 24:
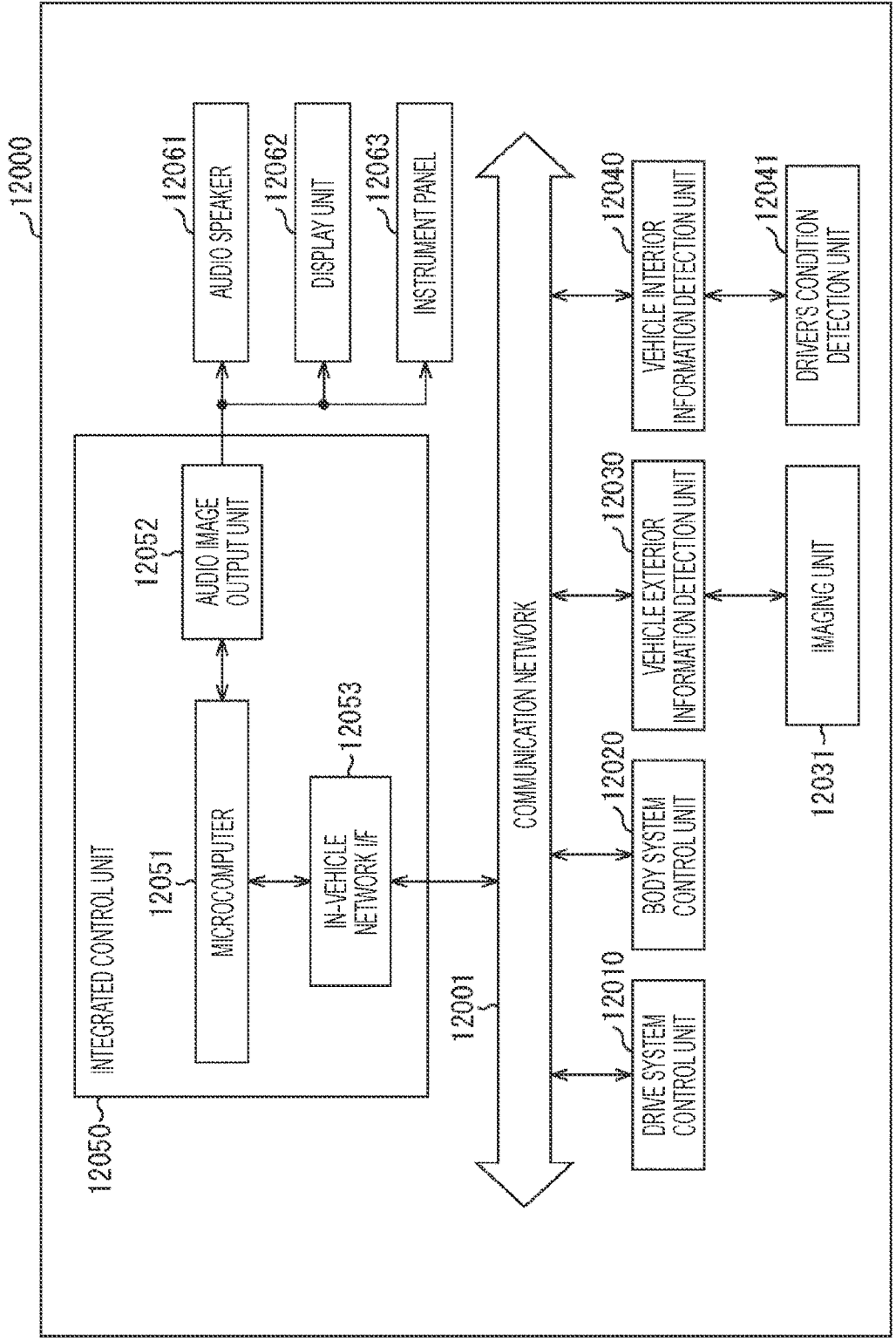
FIG. 24 is a block diagram illustrating an example of a schematic configuration of a vehicle control system.

FIG. 24 is a block diagram illustrating a schematic configuration example of a vehicle control system being an example of a mobile body control system to which the technology according to the present disclosure is applicable.

A vehicle control system 12000 is provided with a plurality of electronic control units connected to one another via a communication network 12001. In the example illustrated in FIG. 24, the vehicle control system 12000 is provided with a drive system control unit 12010, a body system control unit 12020, a vehicle exterior information detection unit 12030, a vehicle interior information detection unit 12040, and an integrated control unit 12050. Furthermore, a microcomputer 12051, an audio image output unit 12052, and an in-vehicle network interface (I/F) 12053 are illustrated as functional configurations of the integrated control unit 12050.

The drive system control unit 12010 controls operation of devices related to a drive system of a vehicle according to various programs. For example, the drive system control unit 12010 serves as a control device of a driving force generating device for generating driving force of the vehicle such as an internal combustion engine or a driving motor, a driving force transmitting mechanism for transmitting the driving force to wheels, a steering mechanism for adjusting a rudder angle of the vehicle, a braking device for generating braking force of the vehicle and the like.

The body system control unit 12020 controls operation of various devices mounted on a vehicle body according to the various programs. For example, the body system control unit 12020 serves as a control device of a keyless entry system, a smart key system, a power window device, or various lights such as a head light, a backing light, a brake light, a blinker, or a fog light. In this case, a radio wave transmitted from a portable device that substitutes for a key or signals of various switches may be input to the body system control unit 12020. The body system control unit 12020 receives an input of the radio wave or signals and controls a door lock device, a power window device, the lights and the like of the vehicle.

The vehicle exterior information detection unit 12030 detects information outside the vehicle equipped with the vehicle control system 12000. For example, an imaging unit 12031 is connected to the vehicle exterior information detection unit 12030. The vehicle exterior information detection unit 12030 allows the imaging unit 12031 to take an image outside the vehicle and receives the taken image. The vehicle exterior information detection unit 12030 may perform detection processing of objects such as a person, a vehicle, an obstacle, a sign, or a character on a road surface or distance detection processing on the basis of the received image.

The imaging unit 12031 is an optical sensor that receives light and outputs an electric signal corresponding to an amount of the received light. The imaging unit 12031 may output the electric signal as the image or output the same as ranging information. Furthermore, the light received by the imaging unit 12031 may be visible light or invisible light such as infrared light.

The vehicle interior information detection unit 12040 detects information in the vehicle. The vehicle interior information detection unit 12040 is connected to, for example, a driver's condition detection unit 12041 that detects a driver's condition. The driver's condition detection unit 12041 includes, for example, a camera that images the driver, and the vehicle interior information detection unit 12040 may calculate a driver's fatigue level or concentration level or may determine whether or not the driver is dozing on the basis of detection information input from the driver's condition detection unit 12041.

The microcomputer 12051 may perform an arithmetic operation of a control target value of the driving force generating device, the steering mechanism, or the braking device on the basis of the information inside and outside the vehicle obtained by the vehicle exterior information detection unit 12030 or the vehicle interior information detection unit 12040, and output a control instruction to the drive system control unit 12010. For example, the microcomputer 12051 may perform cooperative control for realizing functions of advanced driver assistance system (ADAS) including collision avoidance or impact attenuation of the vehicle, following travel based on the distance between the vehicles, vehicle speed maintaining travel, vehicle collision warning, vehicle lane departure warning or the like.

Furthermore, the microcomputer 12051 may perform the cooperative control for realizing automatic driving and the like to autonomously travel independent from the operation of the driver by controlling the driving force generating device, the steering mechanism, the braking device or the like on the basis of the information around the vehicle obtained by the vehicle exterior information detection unit 12030 or the vehicle interior information detection unit 12040.

Furthermore, the microcomputer 12051 may output the control instruction to the body system control unit 12020 on the basis of the information outside the vehicle obtained by the vehicle exterior information detection unit 12030. For example, the microcomputer 12051 may perform the cooperative control to realize glare protection such as controlling the head light according to a position of a preceding vehicle or an oncoming vehicle detected by the vehicle exterior information detection unit 12030 to switch a high beam to a low beam.

The audio image output unit 12052 transmits at least one of audio or image output signal to an output device capable of visually or audibly notifying an occupant of the vehicle or the outside the vehicle of the information. In the example in FIG. 24, as the output device, an audio speaker 12061, a display unit 12062, and an instrument panel 12063 are illustrated. The display unit 12062 may include at least one of an on-board display or a head-up display, for example.

Figure 25:
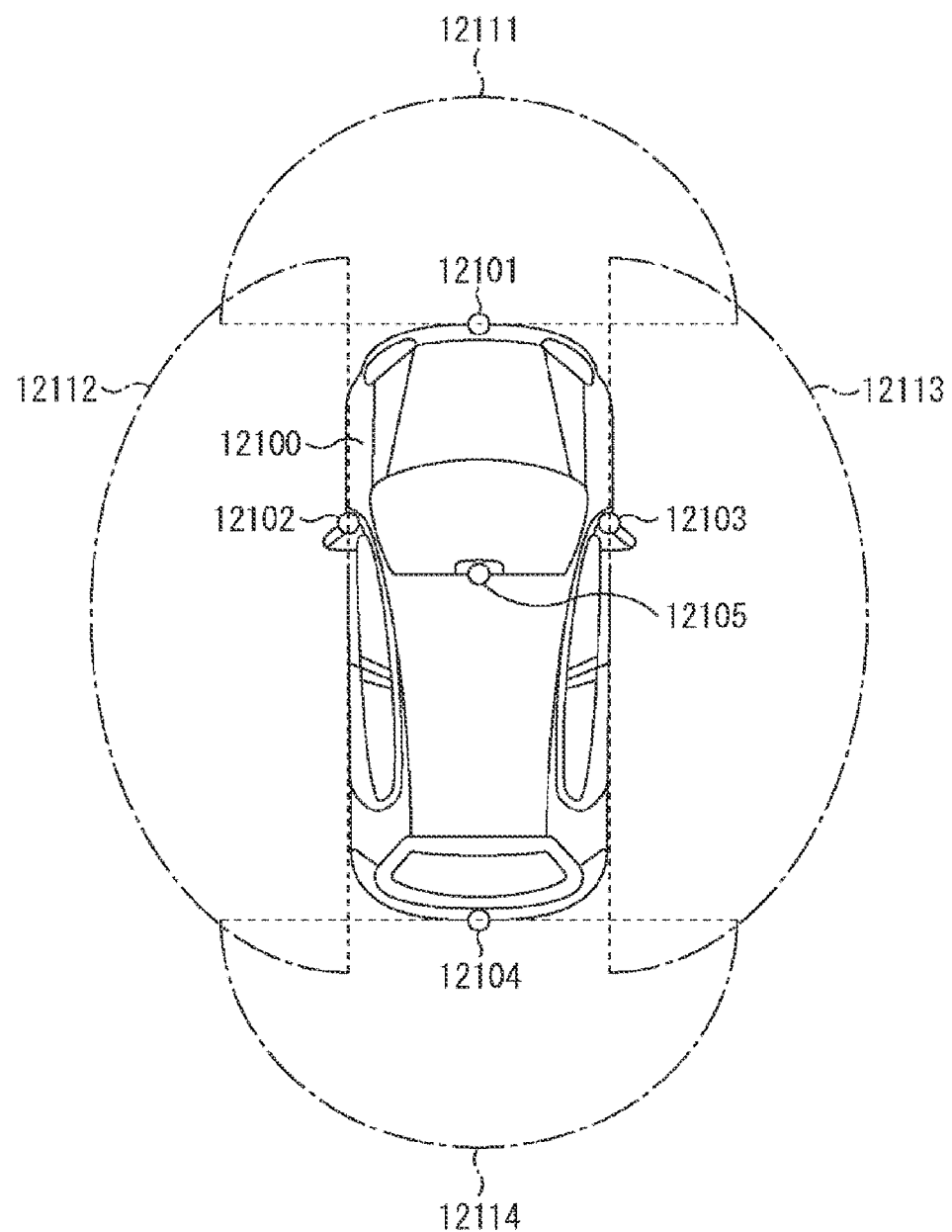
FIG. 25 is an illustrative view illustrating an example of an installation position of a vehicle exterior information detection unit and an imaging unit.

FIG. 25 is a view illustrating an example of an installation position of the imaging unit 12031.

In FIG. 25, imaging units 12101, 12102, 12103, 12104, and 12105 are included as the imaging unit 12031.

The imaging units 12101, 12102, 12103, 12104, and 12105 are provided in positions such as, for example, a front nose, a side mirror, a rear bumper, a rear door, and an upper portion of a front windshield in a vehicle interior of the vehicle 12100. The imaging unit 12101 provided on the front nose and the imaging unit 12105 provided in the upper portion of the front windshield in the vehicle interior principally obtain images in front of the vehicle 12100. The imaging units 12102 and 12103 provided on the side mirrors principally obtain images of the sides of the vehicle 12100. The imaging unit 12104 provided on the rear bumper or the rear door principally obtains an image behind the vehicle 12100. The imaging unit 12105 provided in the upper portion of the front windshield in the vehicle interior is principally used for detecting the preceding vehicle, a pedestrian, an obstacle, a traffic signal, a traffic sign, a lane or the like.

Note that, in FIG. 25, an example of imaging ranges of the imaging units 12101 to 12104 is illustrated. An imaging range 12111 indicates the imaging range of the imaging unit 12101 provided on the front nose, imaging ranges 12112 and 12113 indicate the imaging ranges of the imaging units 12102 and 12103 provided on the side mirrors, and an imaging range 12114 indicates the imaging range of the imaging unit 12104 provided on the rear bumper or the rear door. For example, image data imaged by the imaging units 12101 to 12104 are superimposed, so that an overlooking image of the vehicle 12100 as seen from above is obtained.

At least one of the imaging units 12101 to 12104 may have a function of obtaining distance information. For example, at least one of the imaging units 12101 to 12104 may be a stereo camera including a plurality of imaging elements, or may be an imaging element including pixels for phase difference detection.

For example, the microcomputer 12051 may extract especially a closest solid object on a traveling path of the vehicle 12100, the solid object traveling at a predetermined speed (for example, 0 km/h or higher) in a direction substantially the same as that of the vehicle 12100 as the preceding vehicle by obtaining a distance to each solid object in the imaging ranges 12111 to 12114 and a change in time of the distance (relative speed relative to the vehicle 12100) on the basis of the distance information obtained from the imaging units 12101 to 12104. Moreover, the microcomputer 12051 may set the distance between the vehicles to be secured in advance from the preceding vehicle, and may perform automatic brake control (including following stop control), automatic acceleration control (including following start control) and the like. In this manner, it is possible to perform the cooperative control for realizing the automatic driving and the like to autonomously travel independent from the operation of the driver.

For example, the microcomputer 12051 may extract solid object data regarding the solid object while sorting the same into a motorcycle, a standard vehicle, a large-sized vehicle, a pedestrian, and other solid objects such as a utility pole on the basis of the distance information obtained from the imaging units 12101 to 12104 and use for automatically avoiding obstacles. For example, the microcomputer 12051 discriminates the obstacles around the vehicle 12100 into an obstacle visible to a driver of the vehicle 12100 and an obstacle difficult to see. Then, the microcomputer 12051 determines a collision risk indicating a degree of risk of collision with each obstacle, and when the collision risk is equal to or higher than a set value and there is a possibility of collision, this may perform driving assistance for avoiding the collision by outputting an alarm to the driver via the audio speaker 12061 and the display unit 12062 or performing forced deceleration or avoidance steering via the drive system control unit 12010.

At least one of the imaging units 12101 to 12104 may be an infrared camera that detects infrared light. For example, the microcomputer 12051 may recognize a pedestrian by determining whether or not there is a pedestrian in the images taken by the imaging units 12101 to 12104. Such pedestrian recognition is carried out, for example, by a procedure of extracting feature points in the images taken by the imaging units 12101 to 12104 as the infrared cameras, and a procedure of performing pattern matching processing on a series of feature points indicating an outline of an object to discriminate whether or not this is a pedestrian. When the microcomputer 12051 determines that there is a pedestrian in the images taken by the imaging units 12101 to 12104 and recognizes the pedestrian, the audio image output unit 12052 controls the display unit 12062 to superimpose a rectangular contour for emphasis on the recognized pedestrian to display. Furthermore, the audio image output unit 12052 may control the display unit 12062 to display an icon and the like indicating the pedestrian in a desired position.

An example of the vehicle control system to which the technology according to the present disclosure may be applied is described above. The technology according to the present disclosure may be applied to the imaging unit 12031 out of the configurations described above. Specifically, the imaging device 100 in FIG. 1 may be applied to the imaging unit 12031. By applying the technology according to the present disclosure to the imaging unit 12031, it is possible to image high-quality image data while detecting the address event.

Note that the above-described embodiments describe an example for embodying the present technology, and there is a correspondence relationship between items in the embodiments and the matters specifying the invention in claims. Similarly, there is a correspondence relationship between the matters specifying the invention in claims and the items in the embodiments of the present technology having the same names. However, the present technology is not limited to the embodiments and may be embodied with various modifications of the embodiments without departing from the scope thereof.

Furthermore, the procedure described in the above-described embodiments may be considered as a method including a series of procedures and may be considered as a program for allowing a computer to execute the series of procedures and a recording medium that stores the program. A compact disc (CD), a MiniDisc (MD), a digital versatile disc (DVD), a memory card, a Blu-ray (trademark) disc and the like may be used, for example, as the recording medium.

Note that the effect described in this specification is illustrative only and is not limitative; there may also be another effect.

Note that the present technology may also have a following configuration.

(1) A solid-state imaging element provided with:
    a pixel array unit in which a normal pixel that generates an analog signal by photoelectric conversion of incident light and outputs the analog signal and a detection pixel that detects that an amount of change in incident light becomes larger than a predetermined threshold and outputs a detection result are arranged; and an analog-to-digital conversion unit that converts the analog signal into a digital signal.

(2) The solid-state imaging element according to (1) described above, in which
    the normal pixel is provided with
    a photodiode that photoelectrically converts the incident light to generate electric charge,
    a discharge transistor that discharges the electric charge from the photodiode,
    a former stage electric charge accumulation unit that accumulates the electric charge, a former stage transfer transistor that transfers the electric charge from the photodiode to the former stage electric charge accumulation unit, a latter stage electric charge accumulation unit that accumulates the electric charge and generates a voltage corresponding to an amount of the electric charge, a reset transistor that initializes the latter stage electric charge accumulation unit, and a latter stage transfer transistor that transfers the electric charge from the former stage electric charge accumulation unit to the latter stage electric charge accumulation unit.

(3) The solid-state imaging element according to (2) described above, in which the discharge transistor discharges the electric charge at predetermined exposure starting timing, the former stage transfer transistor transfers the electric charge at predetermined exposure finishing timing, the reset transistor initializes the latter stage electric charge accumulation unit when the electric charge is transferred to the former stage electric charge accumulation unit, and the latter stage transfer transistor transfers the electric charge when the latter stage electric charge accumulation unit is initialized.

(4) The solid-state imaging element according to (1) described above, in which the normal pixel is provided with a photodiode that photoelectrically converts the incident light to generate electric charge, an electric charge accumulation unit that accumulates the electric charge and generates a voltage corresponding to an amount of the electric charge, a transfer transistor that transfers the electric charge from the photodiode to the electric charge accumulation unit, and a reset transistor that initializes the electric charge accumulation unit.

(5) The solid-state imaging element according to (4) described above, in which the transfer transistor transfers the electric charge at predetermined exposure starting timing, the reset transistor initializes the electric charge accumulation unit at the exposure starting timing, the transfer transistor transfers the electric charge at predetermined exposure finishing timing, and the reset transistor initializes the electric charge accumulation unit when the electric charge is transferred.

(6) The solid-state imaging element according to any one of (1) to (5) described above, in which a predetermined number of columns are arranged in a direction perpendicular to a predetermined direction in the pixel array unit, at least one of the normal pixel or the detection pixel is arranged in each of the predetermined number of columns, in the analog-to-digital conversion unit, analog-to-digital converters of a positive integral multiple of the arranged number of the predetermined number of columns are arranged, and each of the predetermined number of analog-to-digital converters converts the analog signal from a different column out of the predetermined number of columns into the digital signal.

(7) The solid-state imaging element according to any one of (1) to (6) described above, in which, in the pixel array unit, the detection pixel is arranged in any of two rows by two columns, and the normal pixel is arranged in the rest.

(8) The solid-state imaging element according to any one of (1) to (6) described above, in which, in the pixel array unit, detection pixels are arranged in two rows by two columns, and normal pixels are arranged in two rows by two columns so as to be adjacent to the detection pixels.

(9) The solid-state imaging element according to any one of (1) to (8) described above, in which the detection pixel further outputs the analog signal.

(10) An imaging device provided with:

a pixel array unit in which a normal pixel that generates an analog signal by photoelectric conversion of incident light and outputs the analog signal and a detection pixel that detects that an amount of change in incident light becomes larger than a predetermined threshold and outputs a detection result are arranged;

an analog-to-digital conversion unit that converts the analog signal into a digital signal; and a digital signal processing unit that processes the digital signal.

REFERENCE SIGNS LIST

100 Imaging device
110 Optical unit
120 DSP circuit
130 Display unit
140 Operation unit
150 Bus
160 Frame memory
170 Storage unit
180 Power supply unit
200 Solid-state imaging element
211 DAC
212 Drive circuit
213 Column arbiter
214 Column address encoder
215 State machine
216 Row address encoder
220 Column AER circuit
221 Column AER block
222 H-side column AER block
223 L-side column AER block
224 OR gate
250 Column ADC
251 ADC
252 CDS circuit
260 Row AER circuit
270 Row AER block
271, 421, 441, 442, 452, 454, 461, 463, 474, 479, 611, 614, 615 to 617, 620, 622, 625, 626 PMOS transistor
272, 273, 416, 417, 420, 455, 462, 464, 471 to 473, 475 to 478, 480, 481, 612, 613, 618, 619, 623, 624, 627 NMOS transistor
276 NOR gate
274, 275, 601, 602, and 621 Inverter
300 Pixel array unit
301 Pixel block
305 Pixel wafer
310 Normal pixel
311 Discharge transistor
312, 418 Photodiode 313, 315 Transfer transistor
314 Analog memory
316 Floating diffusion layer
317 Reset transistor
318 Amplification transistor
319 Selection transistor
400 Address event detection pixel
410 Pixel circuit
422 Logarithmic response unit
440 Buffer
450 Differentiation circuit
451 453 and 482 Capacitance
460 Comparator
470 AER logic circuit
600 Row arbiter
610, 650 to 654 Arbiter block
12031 Imaging unit

What is claimed is:

1. A solid-state imaging element, comprising:
a pixel array unit that includes:
  a set of normal pixels in two rows by two columns, wherein
    a normal pixel of the set of normal pixels is configured to output an analog signal; and
  a plurality of detection pixels, wherein
    the plurality of detection pixels includes a set of detection pixels in two rows by two columns,
    the set of detection pixels is adjacent to the set of normal pixels,
    a detection pixel of the plurality of detection pixels is configured to:
      detect that an amount of change in incident light becomes larger than a first threshold; and
      output a detection result, and
    the detection pixel includes:
      a pixel circuit configured to generate a voltage signal by photoelectric conversion of the incident light;
      a differentiation circuit configured to generate a differentiation signal corresponding to a change in the voltage signal with respect to a reference value, wherein the reference value corresponds to a value of the voltage signal at a time of reset of the differentiation circuit; and
      a comparator configured to compare a level of the differentiation signal with the first threshold and a second threshold to output one of a high-level comparison result or a low-level comparison result as the detection result, wherein the first threshold is higher than the second threshold.

2. The solid-state imaging element according to claim 1, further comprising an analog-to-digital conversion unit configured to convert the analog signal into a digital signal.

3. The solid-state imaging element according to claim 1, wherein the normal pixel includes:
  a photodiode configured to photoelectrically convert the incident light to generate electric charge;
  a discharge transistor configured to discharge the electric charge from the photodiode;
  a former stage electric charge accumulation unit configured to accumulate the electric charge;
  a former stage transfer transistor configured to transfer the electric charge from the photodiode to the former stage electric charge accumulation unit;
  a latter stage electric charge accumulation unit configured to accumulate the electric charge and generate a voltage corresponding to an amount of the electric charge;
  a reset transistor configured to initialize the latter stage electric charge accumulation unit; and
  a latter stage transfer transistor configured to transfer the electric charge from the former stage electric charge accumulation unit to the latter stage electric charge accumulation unit.

4. The solid-state imaging element according to claim 3, wherein
  the discharge transistor is further configured to discharge the electric charge at an exposure starting timing,
  the former stage transfer transistor is further configured to transfer the electric charge at an exposure finishing timing,
  the reset transistor is further configured to initialize the latter stage electric charge accumulation unit based on transfer of the electric charge to the former stage electric charge accumulation unit, and
  the latter stage transfer transistor is further configured to transfer the electric charge based on initialization of the latter stage electric charge accumulation unit.

5. The solid-state imaging element according to claim 1, wherein the normal pixel includes:
  a photodiode configured to photoelectrically convert the incident light to generate electric charge;
  an electric charge accumulation unit configured to accumulate the electric charge and generate a voltage corresponding to an amount of the electric charge;
  a transfer transistor configured to transfer the electric charge from the photodiode to the electric charge accumulation unit; and
  a reset transistor configured to initialize the electric charge accumulation unit.

6. The solid-state imaging element according to claim 5, wherein
  the transfer transistor is further configured to transfer the electric charge at an exposure starting timing,
  the reset transistor is further configured to initialize the electric charge accumulation unit at the exposure starting timing,
  the transfer transistor is further configured to transfer the electric charge at an exposure finishing timing, and
  the reset transistor is further configured to initialize the electric charge accumulation unit based on transfer of the electric charge.

7. The solid-state imaging element according to claim 1, further comprising an analog-to-digital conversion unit configured to convert the analog signal into a digital signal, wherein
  a specific number of columns are in a direction perpendicular to a determined direction in the pixel array unit,
  at least one of the normal pixel or the detection pixel is in each of the specific number of columns,
  the analog-to-digital conversion unit includes a plurality of analog-to-digital converters of a positive integral multiple of the specific number of columns, and
  each of the plurality of analog-to-digital converters is configured to convert the analog signal from a different column out of the specific number of columns into the digital signal.

8. The solid-state imaging element according to claim 1, wherein the detection pixel is further configured to output the generated voltage signal.

9. The solid-state imaging element according to claim 1, further comprising:
  an analog-to-digital conversion unit configured to convert the analog signal into a digital signal; and a correlated double sampling unit configured to obtain a difference between a reset level on the digital signal and a signal level on the digital signal, wherein the reset level is a level of the analog signal that is set based on initialization of a latter stage electric charge accumulation unit in the normal pixel.

10. The solid-state imaging element according to claim 9, wherein the signal level is a level of the analog signal that is set based on an exposure amount.

11. The solid-state imaging element according to claim 1, wherein
the detection pixel includes a buffer configured to perform impedance conversion of the voltage signal,
the differentiation circuit includes a first capacitance, a second capacitance, a PMOS transistor, and an NMOS transistor,
a first end of the first capacitance is connected to the buffer and a second end of the first capacitance is connected to one end of the second capacitance and a gate of the PMOS transistor,
the PMOS transistor is connected to the NMOS transistor in series between a power supply and a ground terminal,
a bias voltage is applied to a gate of the NMOS transistor on a ground side, and
a connection point of the PMOS transistor and the NMOS transistor is connected to the comparator.

12. An imaging device, comprising:
a pixel array unit that includes:
   a set of normal pixels in two rows by two columns, wherein
      a normal pixel of the set of normal pixels is configured to output an analog signal; and
   a plurality of detection pixels, wherein
      the plurality of detection pixels includes a set of detection pixels in two rows by two columns,
      the set of detection pixels is adjacent to the set of normal pixels,
      a detection pixel of the plurality of detection pixels is configured to:
         detect that an amount of change in incident light becomes larger than a first threshold; and
         output a detection result, and
      the detection pixel includes:
         a pixel circuit configured to generate a voltage signal by photoelectric conversion of the incident light;
         a differentiation circuit configured to generate a differentiation signal corresponding to a change in the voltage signal with respect to a reference value, wherein the reference value corresponds to a value of the voltage signal at a time of reset of the differentiation circuit; and
         a comparator configured to compare a level of the differentiation signal with the first threshold and a second threshold to output one of a high-level comparison result or a low-level comparison result as the detection result, wherein the first threshold is higher than the second threshold; and
an analog-to-digital conversion unit configured to convert the analog signal into a digital signal.

* * * * *